United States Patent
Corn

(10) Patent No.: US 6,170,899 B1
(45) Date of Patent: Jan. 9, 2001

(54) VEHICLE SUNVISOR

(76) Inventor: Jack E. Corn, 1644 S. Jamestown, Tulsa, OK (US) 74112-6832

(*) Notice: Under 35 U.S.C. 154(b), the term of this patent shall be extended for 0 days.

(21) Appl. No.: 09/444,751

(22) Filed: Nov. 22, 1999

Related U.S. Application Data

(60) Division of application No. 09/373,328, filed on Aug. 12, 1999, now Pat. No. 6,099,066, which is a continuation-in-part of application No. 08/740,469, filed on Oct. 30, 1996, now Pat. No. 5,833,299, which is a continuation-in-part of application No. 08/311,419, filed on Sep. 23, 1994, now abandoned, which is a continuation-in-part of application No. 07/917,970, filed on Jul. 24, 1992, now Pat. No. 5,350,212.

(51) Int. Cl.$^7$ .................................................. B60J 1/22
(52) U.S. Cl. ............................ 296/97.4; 296/97.11
(58) Field of Search ............................ 276/97.4, 97.9, 276/97.11; 200/61.73

(56) References Cited

U.S. PATENT DOCUMENTS

| | | | |
|---|---|---|---|
| H1834 | 2/2000 | Wilson et al. ............ | 296/97 |
| 3,403,937 | * 10/1968 | Quaine .................. | 296/97.11 |
| 4,934,753 | * 6/1990 | Gajewski ............... | 296/211 X |
| 5,158,334 | * 10/1992 | Felland ................. | 296/97.4 |
| 5,538,310 | * 7/1996 | Frankhouse et al. ..... | 296/97.4 |

* cited by examiner

*Primary Examiner*—Dennis H. Pedder
(74) *Attorney, Agent, or Firm*—Head, Johnson & Kachigian

(57) ABSTRACT

A sunvisor attached to a vehicle. The sunvisor includes a sunvisor shell and a track assembly having a first portion and a second portion in angular relation to the first portion. A pair of blocks are provided, each block pivotally attached to the shell. The blocks slidably move within the track assembly through use of a belt that is attached to at least one block and that travels within the track assembly. A motor rotates a drive gear to move the belt in order to change the angular relation of the shell to the vehicle. The shell has an elongated opening with a support rod passing through the elongated opening. The sunvisor support rod has a clamp inside the visor shell compressing against the rod and capable of sliding forward and rearward in the elongated opening. The clamp also can rotate upon the rod thereby allowing the shell to be rotated into use. A further embodiment provides a sunvisor shell mounted to a bracket with a support rod. The support rod is rotatable in a collar hole in the bracket. The bracket slides within a track having a top side (which would be substantially parallel the sheetmetal roofline of a vehicle), two sides perpendicular to the top side and a bottom side parallel and below the top side. The bottom side of the track has an elongated slot through which the support rod can travel.

24 Claims, 20 Drawing Sheets

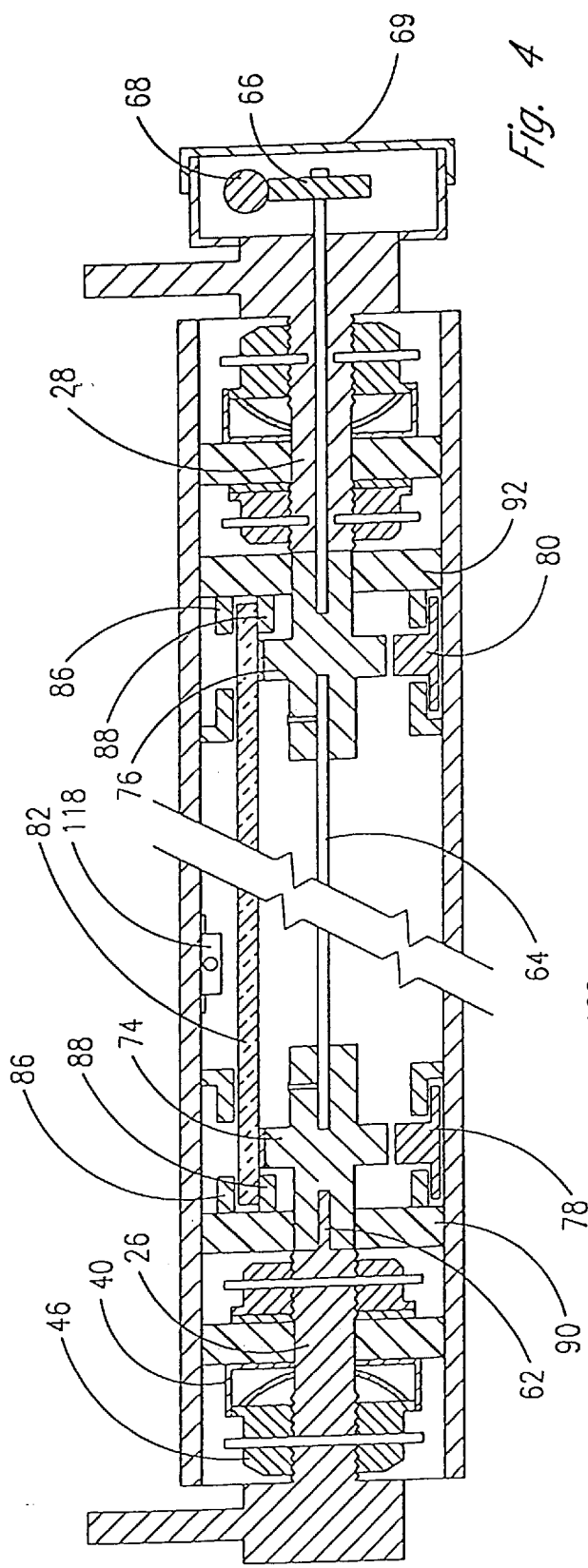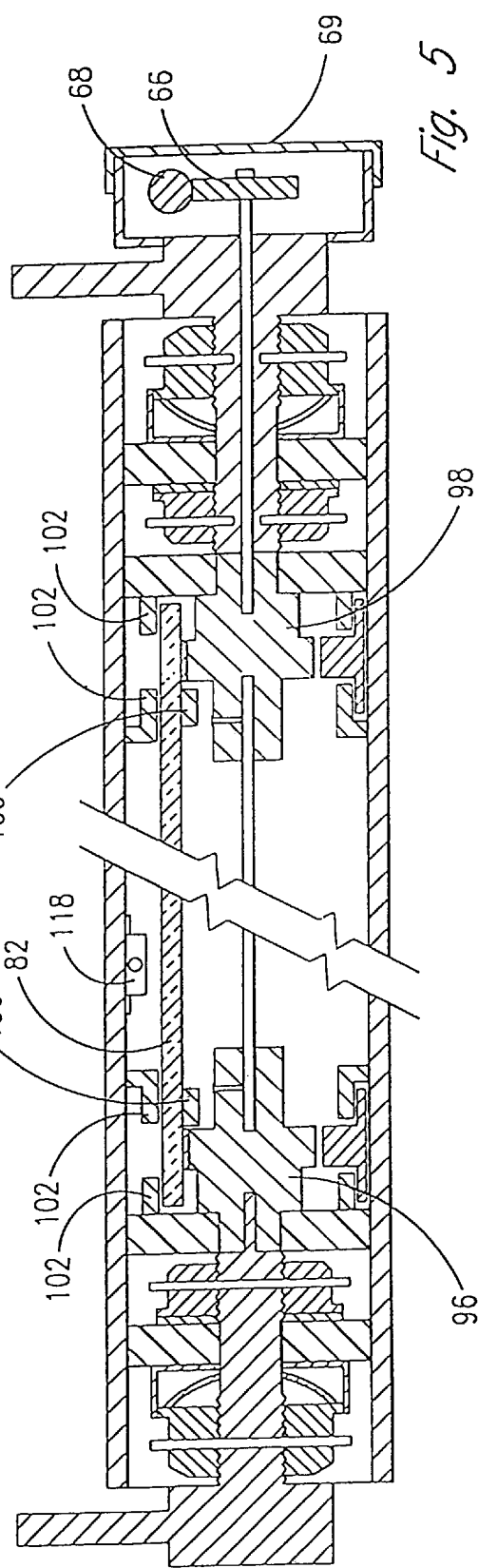

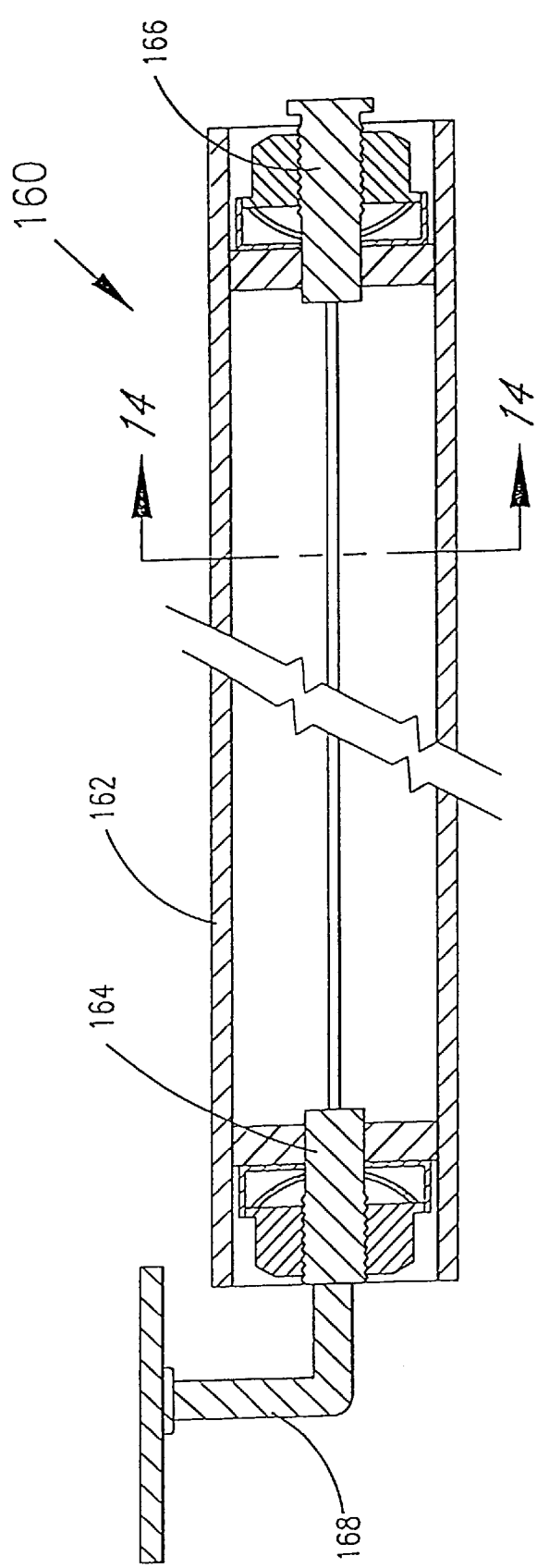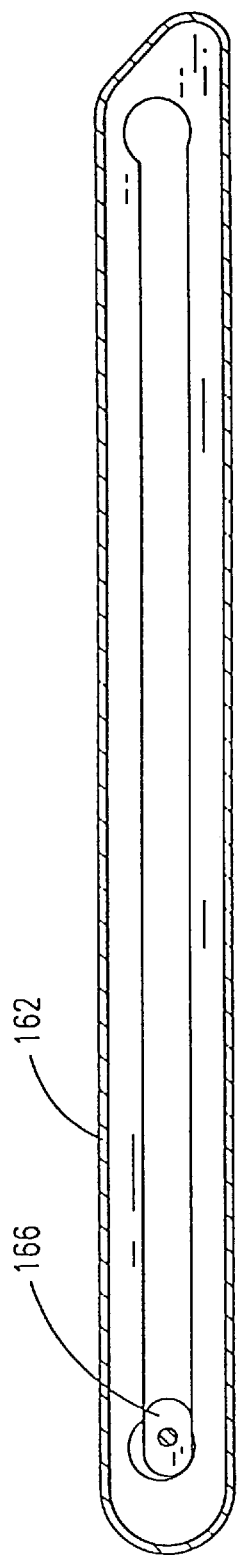

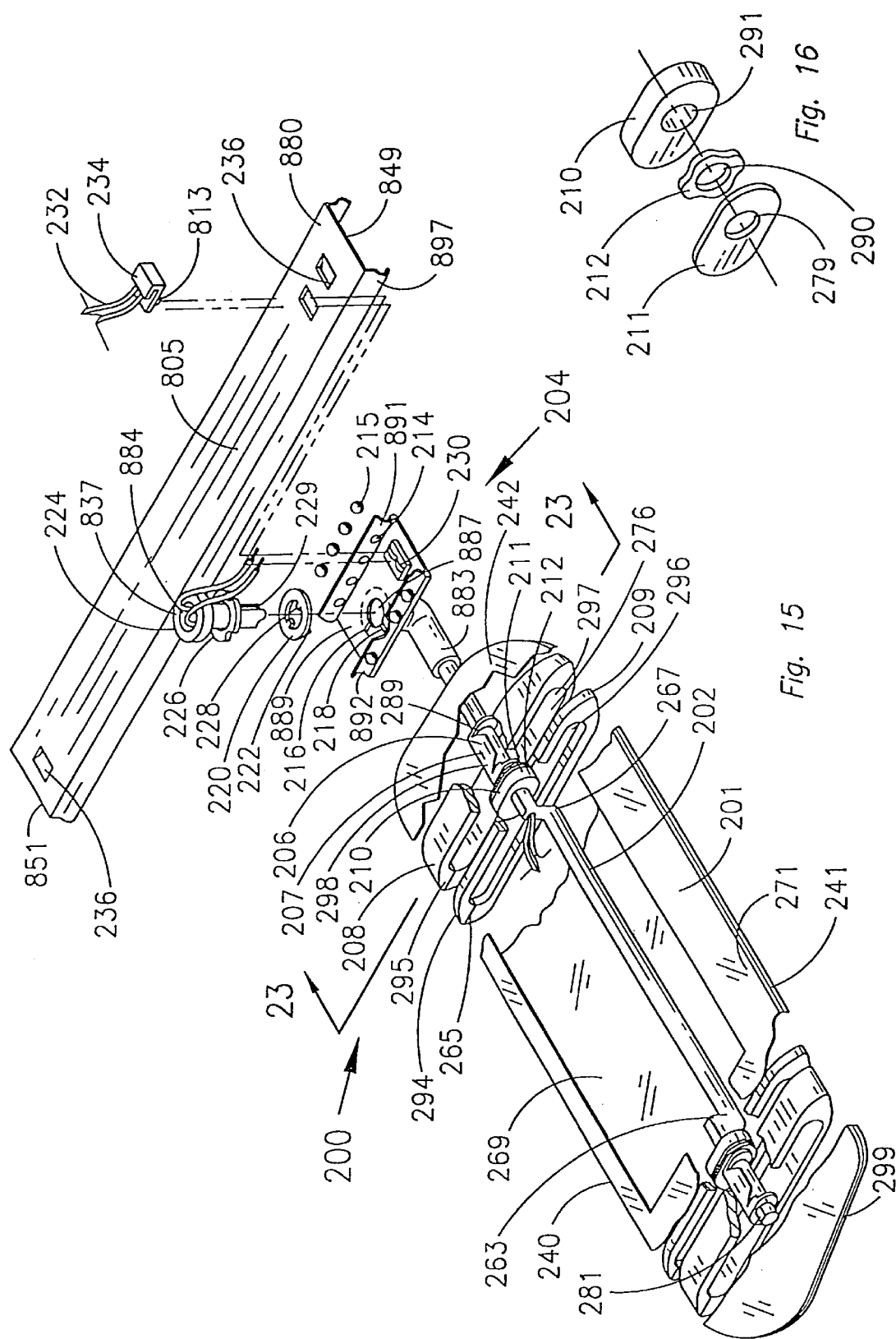

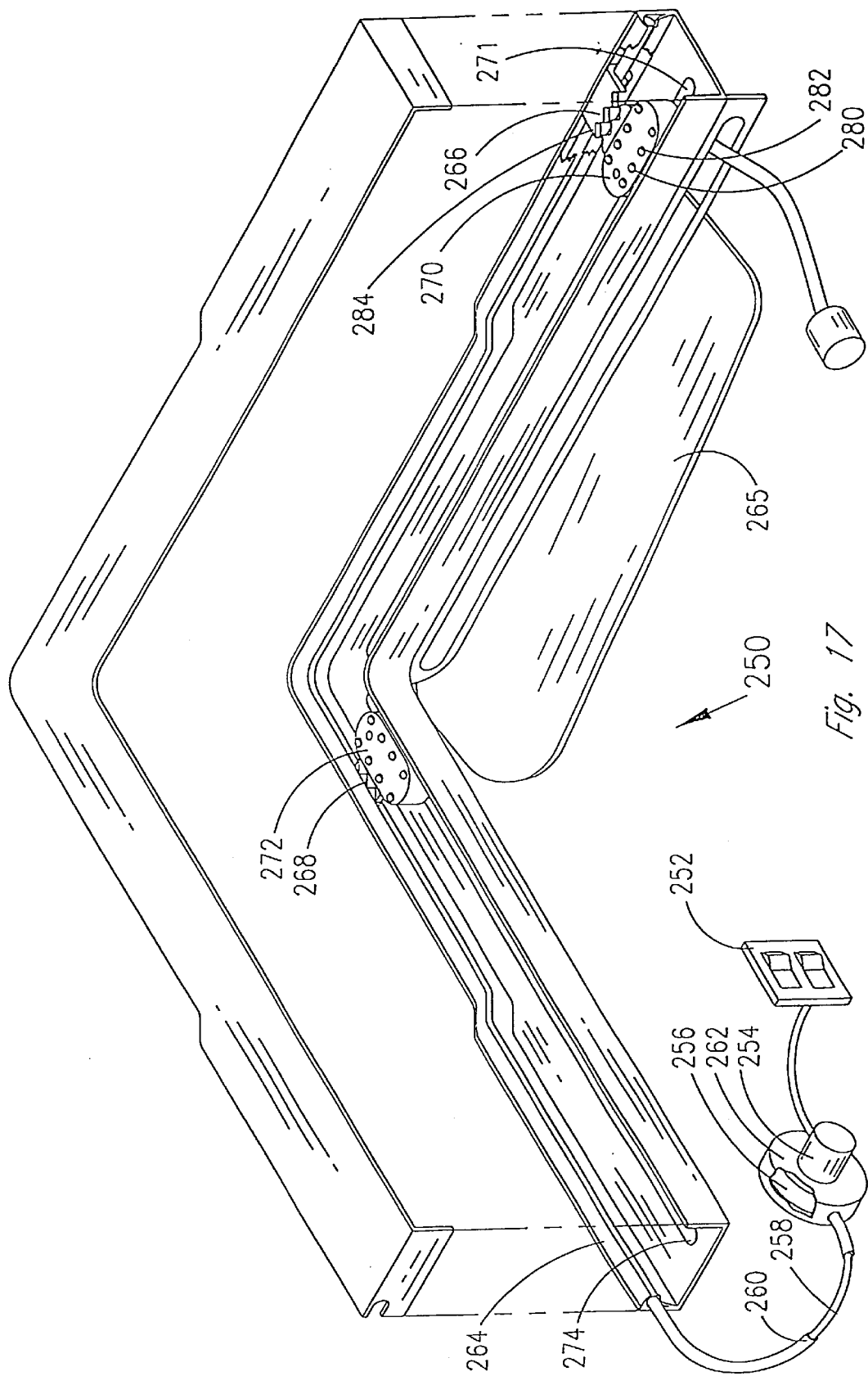

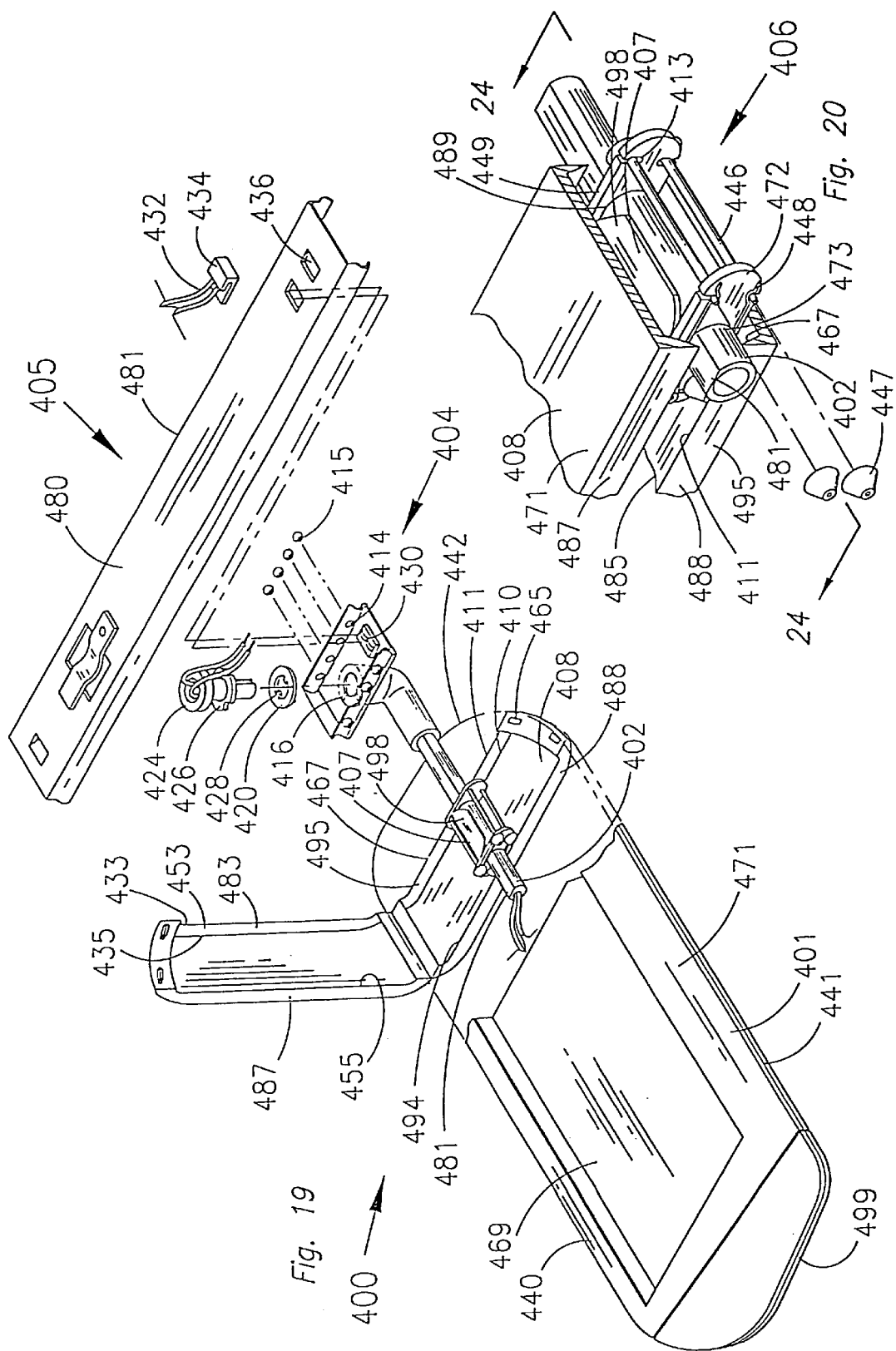

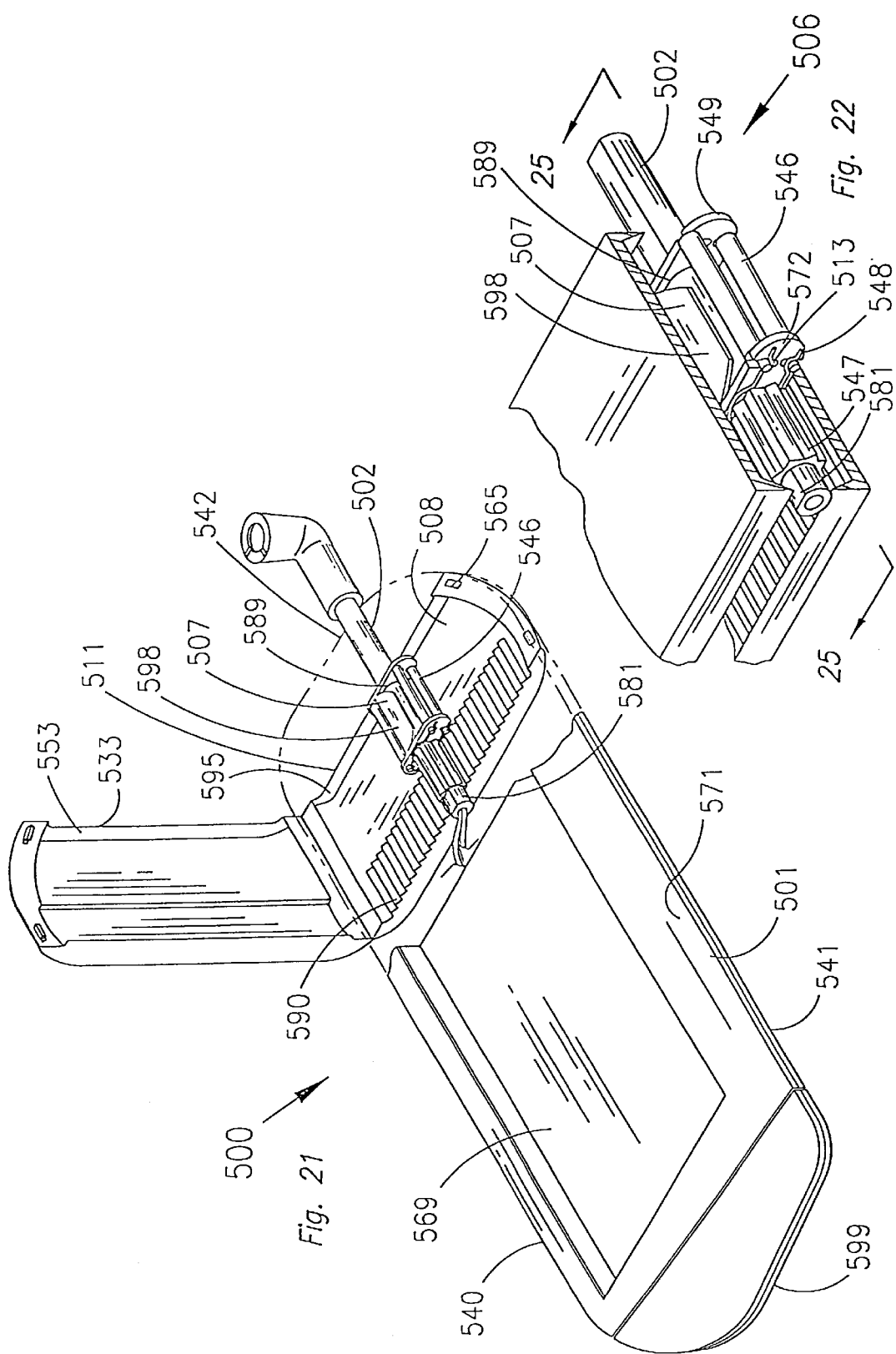

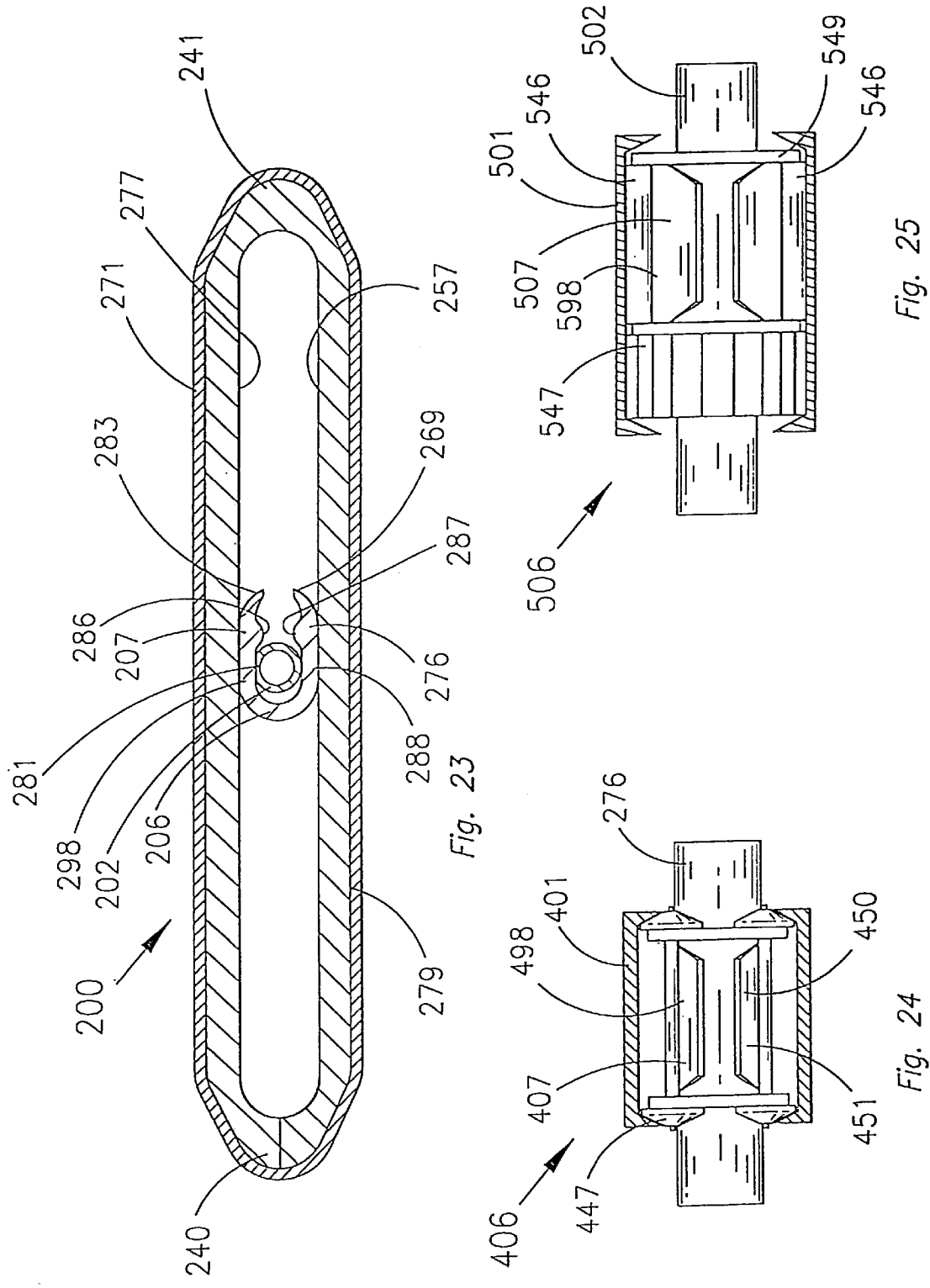

VEHICLE SUNVISOR

BACKGROUND OF THE INVENTION

This is a divisional application of Ser. No. 09/373,328 filed on Aug. 12, 1999, now U.S. Pat. No. 6,099,066, which is a continuation-in-part of application Ser. No. 08/740,469, filed Oct. 30, 1996, entitled VEHICLE SUNVISOR, now U.S. Pat. No. 5,833,299, which is a continuation-in-part of application Ser. No. 08/311,419, filed Sep. 23, 1994, now abandoned, entitled VEHICLE SUNVISOR, which is a continuation-in-part of application Ser. No. 07/917,970, filed Jul. 24, 1992, entitled VEHICLE SUNVISOR GLARESHIELD, now U.S. Pat. No. 5,350,212.

BACKGROUND OF THE INVENTION

1. Field of the Invention

The present invention pertains to a sunvisor for a vehicle. The sunvisor support rod can be slid on a track from a position parallel the front windshield of a car to a position substantially parallel the side window of a car. In particular, the present invention pertains to a sunvisor which is attached to a bracket by the support rod. The slideable bracket, which has electrical contacts mounted to it, slides in a track which also has electrical contacts near at least one end. The track is molded, or attached to a headliner or front interior sheet-metal roof of a vehicle. A control turn arm is attached to the sunvisors support rod above the headliner and slides and rotates about a channel guide attached to the top side of the headliner. The control turn arm will automatically turn the visor support rod and the visor shell as the sunvisor shell is slid below the track to a side window position. A lighted vanity mirror can be placed on the sunvisor shell with electricity being supplied by the electrical contacts attached to the bracket and to the track. A lever can be attached to the bracket so the user can slide the sunvisor assembly with the lever.

2. Prior Art

Sunvisors for automobiles and the like are well known. In most sunvisors an attachment point is created at the corner of a car. The sunvisor has a support rod that is attached to an end edge of the visor and is then attached to a mounting bracket which is secured to the corner of a vehicles interior roof. The sunvisor blade or housing can be rotated down to block the sun from the windshield position. The sunvisor housing can also be turned to the side window by grabbing the housings free end and turning the free end toward the side window. The free end is near the center of the vehicle and is pulled back toward the user and then rotated to the side window.

Suggestion have been put forth for improving the movement of the visor, including U.S. Pat. No. 2,978,274 by Quaine which shows a sunvisor that moves along a track and has two attachment points to the track and the track having a first portion along the windshield and a second portion along the side window. U.S. Pat. No. 3,403,937 by Ordman suggests a method for moving a sunvisor along a rail with the sunvisor having two attachment points to the rail and the rail having a first portion along the windshield and a second portion along the side window. Each of these suggested methods for operating a sunvisor fall short in that each suggests track or rail along the windshield and also along the side windows and also require two attachment points for the visors. Neither is commercially feasible because of the design and the cost. More recent suggestions such as U.S. Pat. No. 5,031,952 by Miyamoto et al. suggest a method of deploying a sunvisor within a track concealed in the headliner. This method doesn't provide for side window protection and also has the sunvisor attached at two different places. It also uses up additional space between the headliner and the roof for the frame and mechanism which deploys the visor.

Several methods have been suggested for providing an easier method to move a sunvisor to the side window. Prior art has nevertheless failed to address an efficient method of making and of operating a tracking sunvisor. None of the suggested methods have been commercialized because of their failure to address these problems. The present invention addresses these problems by providing a sunvisor that slides upon a track, attached or molded to the headliner. This creates a modular headliner that distributes the weight of a visor assembly and the force of use of the visor over the entire track area and therefor over a larger area of the headliner. It also allows for much easier assembly and less components to install on the assembly line. The track and bracket assembly proposed provides an extremely low profile assembly with a structure that allows a sunvisor shell to be operated with one attachment point to the track. The track is easily attached and placed on the headliner with a minimal amount of headroom used. The structure of the track, bracket and bearing assembly, also allow the sunvisor which is attached to the bracket by a support rod to move easily from a rested position parallel the front windshield to an in-use position at one of the front side windows. The sunvisor support rod which is rotate-able within a collar hole in the bracket; can be slid to the side window upon the track. Electrical contacts are provided upon the bracket and also upon one end of the track.

It is a further object and purpose of the present invention to provide a sunvisor assembly that slides in a track. The sunvisor has a support rod attached to a bracket and rotate-able within a bracket collar hole in the bracket. The support rod has a control turn arm fixedly attached near the upper end of the support rod. The control turn arm has an elongated slot which slides and rotates around a channel guide. The channel guide is mounted above the headliner and adjacent and behind the track. The control turn arm will automatically turn the support rod and the visor shell toward the side window or back to a rested state parallel the windshield; as the visor bracket is slid along the longitudinal length of the track parallel the windshield. A lever is attached to the bracket assembly. The lever extends into the interior of the vehicle and is just below the headliner and the track. The levers surface is below and parallel the bottom of the track and adjacent and above the sunvisor shell. The lever can be pushed or pulled by the user to slide the visor shell to the in-use position or to the rested position.

It is a further object and purpose of the present invention to provide a sunvisor that slides below a track on a bracket. The slideable bracket has electrical contacts attached to it which move with the bracket and provide electric to the lighted vanity mirror assembly on the sunvisor shell when the bracket and attached visor are in the rested position parallel the front windshield. The track has electrical contacts near at least one end and when the bracket is slid to the rested position the brackets contacts and the tracks contacts are in contact and complete the electrical circuit. This provides electric to the vanity mirror assembly.

Accordingly it is a principal object and purpose of the present invention to provide a sunvisor that has a bracket which slides in a track. The track is parallel the windshield or front window of a vehicle and attached or molded to the headliner. In this version, the track is parallel the front windshield. The bracket slides within the track and has a support rod attached and rotatable within the bracket collar hole in the bracket. The sunvisors shell has a slot that allows the sunvisor shell to move radially about the rod passing therethrough and an oblong clamp surrounding the rod to allow the sunvisor shell to move linearly upon the oblong clamp.

SUMMARY OF THE INVENTION

The sunvisor of the present invention includes a sunvisor shell which is connected to a support assembly. The support assembly would be fastened or otherwise attached to the headliner or roof of the vehicle. The support assembly in a preferred embodiment is a track and comprises a first portion and a second portion in angular relation to the first portion. Extending from the support assembly is a pair of boot arms. Each boot arm terminates in a boot which extends radially from its respective boot arm. Each boot arm has a pivot joint so that each boot is rotatable radially.

The sunvisor can also include a gear drive mechanism. A shaft passes through one of the boots and extends to a gear which is drivingly engaged with a worm gear. The worm gear is at the terminus of a rotatable, flexible shaft. The flexible shaft is rotated by a motor.

The shaft, interior to the sunvisor shell, turns a pair of gears which extend radially from the shaft. Each gear meshes with a rack. Rotation of the shaft will cause the gears to rotate. Rotation of the gears causes the racks to move linearly moving the sun visor shell.

A glare shield can be attached to the racks. In this embodiment, the racks are extendible, flexible and not permanently secured to the sunvisor shell. A switch may be operated so that the rack is either movable with respect to the shell or is stationary with respect to the shell. When the racks are stationary with respect to the shell, the rotation of the gears causes the shell to move with respect to the boots. Alternatively, when the switch allows the racks to move, rotation of the gears causes the racks to move which in turn causes linear movement of a glare shield which is in the initial position within the shell. Depending upon rotation of the gears, the glare shield will either extend from the shell or will retract into the shell through an opening upon the shell.

The glare shield is retained between support rails and rack gear retaining rails. The movement of the sunvisor shell and the glare shield is accomplished by a motor which is controlled by a switch.

A solenoid operates a plunger which may have an extension. When the plunger extension is extended, the racks are stationary with respect to the sunvisor shell and the shell will move. When the plunger extension is retracted, by operation of the solenoid, rotation of the gears will move the racks, thereby moving the glare shield.

The sunvisor may also be arranged so that the sunvisor shell is on either the driver window or the passenger window side. Each boot arm terminates in a block which is allowed to travel within the support assembly. A continuous belt travels within the track and passes around each block and is attached to at least one block. Rotation of a track assembly gear by a track motor will move the blocks. Accordingly, the sunvisor shell may be moved between the position for use in the front window and for use in the side window.

An additional embodiment which provides a sunvisor shell mounted to a bracket with a support rod. The bracket has a bottom rectangular side, two contoured side walls perpendicular to the bottom side. The bracket slides within a track. The track that has a top side (which would be substantially parallel the sheetmetal roofline of a vehicle), two sides perpendicular to the top side and a bottom side parallel and below the top side. The bottom side has an elongated slot through which the support rod can travel. A bearing system is provided to allow the bracket to slide easily within the track. The track has an electrical contact mounted near at least one end and the slideable bracket has an electrical contact attached to it that moves with the bracket. The shell has an elongated opening through at least one end. A support rod is attached to a mount in the vehicle and then passes through the elongated opening into the shell. A clamp surrounds and grasps the rod and rides within an elongated clamp support structure. The visor and clamp may be rotated about the rod or the visor shell may be slid over the clamp forward or rearward parallel the headliner of the vehicle.

The preferred embodiment provides a sunvisor shell mounted to a bracket with a support rod. The bracket has a bottom rectangular side, two contoured side walls perpendicular to the bottom side and the bracket slides within a track. The track has a top side (which would be substantially parallel the sheetmetal roofline of a vehicle), two sides perpendicular to the top side and a bottom side parallel and below the top side. The bottom side has an elongated slot through which the support rod can travel. A bearing system is provided to allow the bracket to slide easily within the track. The track has an electrical contact mounted near at least one end and the slide-able bracket has an electrical contact mounted to it. The upper end of the support rod passes up through the slot in the bottom of the track and up through an elongated opening in the top of the track. Mounted over the end of the support rod is a control turn arm. The control turn arm has a round receiving hole adjacent to its forward end, through which the upper end of the support rod is placed. The control turn arms receiving hole slides down over the upper end of the support rod. The control turn arm is held in place from rotation about the upper end of the support rod by protrusions upon the inner edge of the receiving hole. The protrusions fit within matching contours or channels along the upper portion of the support rods surface. The channels are molded into the upper portion of the support rods shaft and begin at the top end and continue down along the longitudinal axis of the rod. The control turn arm extends outward perpendicular and horizontal from the upper end of the support rod and also outward and behind the track. The control turn arm can be made of plastic or any suitable material and is molded with an elongated slot cut out of its surface. The elongated slot begins just adjacent and behind the receiving hole and continues toward the trailing end of the control turn arm and ends just adjacent the trailing ends edge. The slot is rectangular in shape; with the longitudinal sides being parallel the longitudinal outer sides of the control turn arm.

Mounted to or molded to the headliner just adjacent to and behind the track is a channel guide which is round in shape and rises vertically up from the surface it is mounted to. The channel guide has a tower that rises vertically up from the base of the channel guide and the towers diameter is slightly smaller than the width of the control turn arm slot. The control turn arms slot fits around the channel guides tower.

As the visor is slid from a position parallel the front windshield to the side window; the bracket which is in the rested position near the inner end of the track or center of a vehicle; slides in the track toward the corner of the vehicle. The attached and rotate-able upper end of the support rod is turned by the control turn arm which is pivoting and sliding around the channel guides tower. This causes the visor shell to rotate. The channel guide is stationary and therefore causes the control turn arms longitudinal sides angle to change in relation to the tracks longitudinal sides; as the bracket assembly is slid in the track parallel the windshield of the vehicle.

A still further embodiment comprises a sunvisor shell which is attached to a support rod. The support rod has an upper end and a lower end that are formed by bending the support rod and creating an approximately 90° angle. The support rod now has a lower end which is generally parallel and below a headliner; and is slid into one of the sunvisor shells ends and supports the sunvisor shells movement upon the support rod. The support rod has an upper end whose longitudinal axis is generally perpendicular to the headliner; and from the rods angled portion continues up through a slot in the headliner, up through a slot in the bottom of the track and is then attached to a bracket. The bracket is slide-able in the track which is mounted or molded to the top side of the headliner. The track which has electrical contacts upon at least one end, is mounted at or near the front of the headliner and adjacent the windshield or front window. In this version, the tracks longitudinal sides lie parallel the windshield. The inner end of the track would lie near the center of a vehicle and the tracks outer end would lie near the outer corner of the front of the vehicles interior. It is suggested that there would be two tracks, one for the drivers side and one for the passengers side.

The track has a top side which has a centered elongated opening that runs the entire length of the top of the track. This create two ledges on each side of the opening. The ledges are parallel each other and on the same plane as each other. The longitudinal edges of the top side of the track now curve around perpendicular to the top side and form the two side walls of the track. The two side walls have a contour formed along their length in which bearings can ride. The lower longitudinal edges of the two side walls now curve around and form the bottom of the track. The bottom side of the track is now parallel and below the top side of the track. The track has two ends, which are perpendicular to the longitudinal sides of the track. The ends are open. The bottom side has a slot cut out beginning adjacent one end and continuing to just adjacent the opposing end. The slots opening is cut out of the bottoms longitudinal center. The end view of the track would resemble a flat sided semi-closed C.

The bracket has a bottom side rectangular in shape and has a round bracket collar hole through which the upper end of the support rod can be placed. The bracket collar hole in the bracket is a raised circular surface which rises up off the surface of the top side of the bottom of the bracket; giving the bracket collar hole a round interior vertical shaft opening in which the support rods upper end will remain perpendicular to the bracket and track. The bracket has two side walls that rise up off the bottom side and are generally perpendicular to the bottom side. The side walls are contoured inward along their longitudinal sides and have small holes along each of their respective surfaces which receive bearings. The bearings are placed in the small holes in the side walls of the bracket and will slide along the contoured inner side walls of the track when assembled. The bearings in other words are between the brackets outside side walls and the tracks interior walls. The bracket is placed within the track. The support rods upper end is placed through the bracket collar hole in the bracket and continues vertically up into the track.

The upper end of the support rod passes up through the elongated opening in the top of the track. Mounted over the end of the upper support rod is a control turn arm. The control turn arm has a round receiving hole adjacent to the forward end, through which the upper end of the support rod is placed. The control turn arms receiving hole slides down over the upper end of the support rod. The control turn arm is held in place from rotation about the upper end of the support rod by protrusions upon the inner edge of the receiving hole. The protrusions fit within matching contours or channels in the upper end of the support rods surface. The channels are molded into the upper end of the support rods shaft and begin at the top and continue down along the longitudinal axis of the rod. The control turn arm extends outward perpendicular and horizontal from the upper end of the support rod and also outward and behind the track. Mounted to or molded to the track is a channel guide panel which extends outward and behind the track. The channel guide panel is on a plane parallel the top side of the track and has an elongated slot cut out. The slot is longitudinally centered in the channel guide panel and is at a transverse angle to the tracks longitudinal sides. The slot begins just behind the tracks back top longitudinal side and near the inner end of the track. Mounted to the trailing end of the control turn arm and on the control arms bottom side is a small contoured wheel that rides in the channel guide slot. The wheel slides within the channel guide slot.

As the visor is slid from a position parallel the front windshield to the side window; the bracket which is in the rested position near the center of the car; slides in the track toward the front corner of the vehicle. The attached upper support rod is turned by the control turn arm, and the control turn arm is pivoting and sliding in the channel guide panels slot. The channel guide panels slot is stationary and therefore causes the control turn arms longitudinal sides angle to change in relation to the tracks longitudinal sides; as the bracket assembly is slid laterally in the track parallel the windshield of the vehicle. Electric is supplied to the lighted vanity mirror assembly with a wiring harness which slides through the hollow support rod. One end of the wiring harness plugs into the vanity mirror assembly with common means. The top end of the wiring harness has a connector that slides over contacts on the bracket. The track has electrical contacts mounted to an attached electrical track tower. When in the rested position, the track tower contacts and the bracket contacts are in contact and provide power.

BRIEF DESCRIPTION OF THE DRAWINGS

FIG. 4 is a sectional view taken along section line 4—4 of FIG. 1;

FIG. 5 is a sectional view of an alternate embodiment of the sunvisor;

FIG. 13 is a further alternate embodiment of the sunvisor which may be manually positioned; and FIG. 14 is a sectional view taken along section line 14—14 of FIG. 13.

FIGS. 15 and 16 are exploded views of a further alternate embodiment of the sunvisor which may be manually positioned;

FIG. 17 is an alternate embodiment of the track assembly for the present invention;

FIGS. 19 and 20 are exploded views of a further alternate embodiment of the sunvisor which may be manually positioned;

FIGS. 21 and 22 are exploded views of a further alternate embodiment of the sunvisor which may be manually positioned;

FIG. 23 is a sectional view taken along section line 23—23 of FIG. 15.

FIG. 24 is a sectional view of the shell taken along section line 24—24 of FIG. 20.

FIG. 25 is a sectional view of the shell taken along section line 25—25 of FIG. 22.

DETAILED DESCRIPTION OF THE PREFERRED EMBODIMENTS

Figure 1:
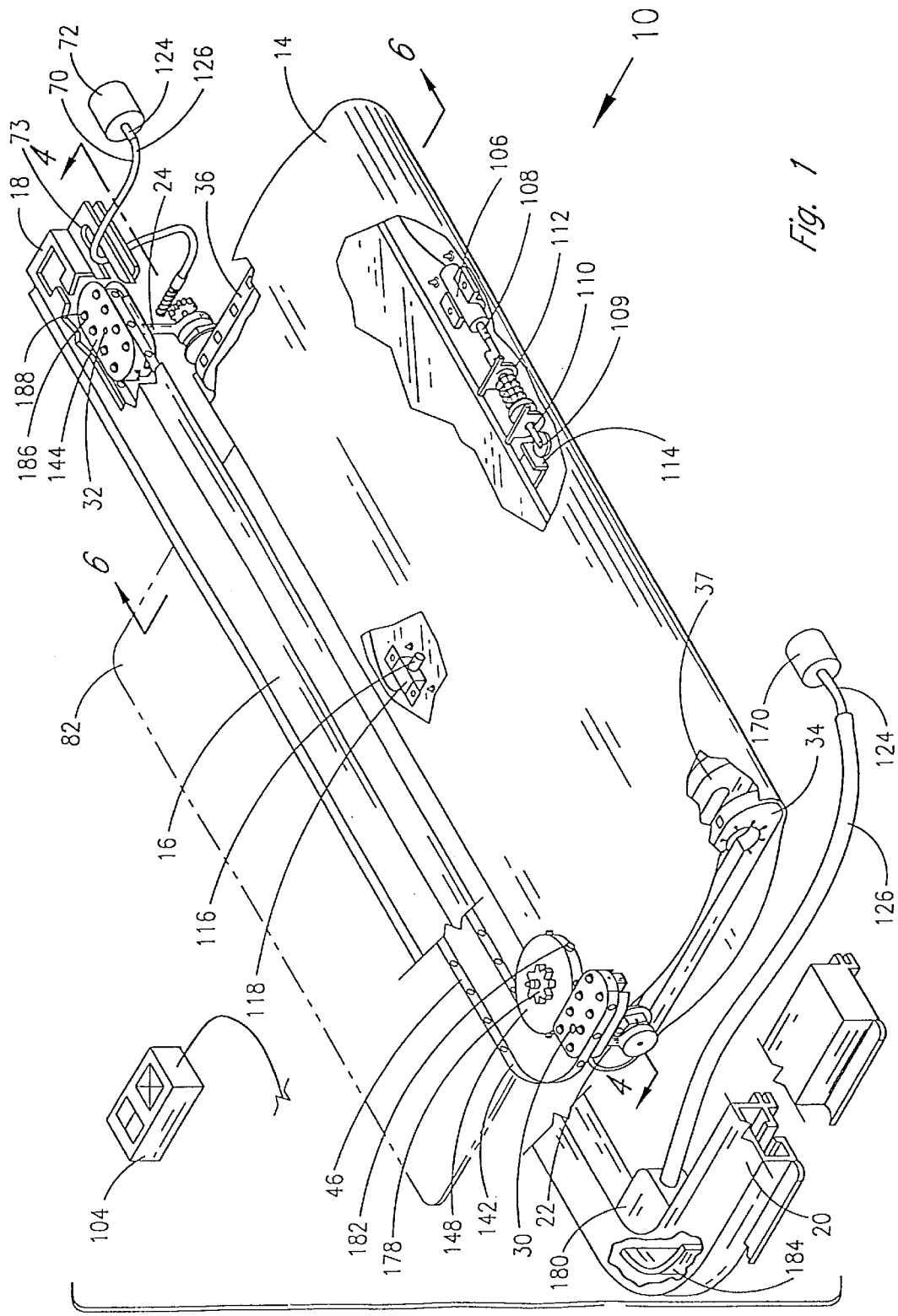
FIG. 1 is a perspective view of a sunvisor device constructed in accordance with the present invention showing several portions cut-away for clarity.

Referring to the drawings in detail, FIG. 1 illustrates a perspective view of a sunvisor 10 constructed in accordance with the present invention which is shown apart and detached from a vehicle (not shown) and, for purposes of understanding, has the gear moved to the right, and the flexible shaft slot is cutaway. The sunvisor includes a sunvisor shell 14 which may be made of any suitable material such as plastic, fiberglass or metal. The shell may be covered with a material for a finished look and to match the interior of the vehicle.

The sunvisor shell can be connected with a support assembly 16 such as a track. The track assembly 16 would be connected or attached to the headliner or roof of the vehicle (not shown). The track assembly includes a first portion 18 which would be spaced from and substantially parallel with the front windshield. The track assembly also can include a second portion 20 in angular relation to the first portion and is substantially parallel with the driver front window. It will be understood that the track assembly may, alternatively, have a second portion parallel with the passenger front window. The operation of the track assembly will be explained in detail below.

Extending from the track assembly 16 is a pair of boot arms 22 and 24. Each boot arm terminates in a boot 26 and 28, respectively, which extends radially from each boot arm. Each boot arm has a pivot joint 30 and 32, respectively, so that each boot is rotatable radially.

Figure 2:
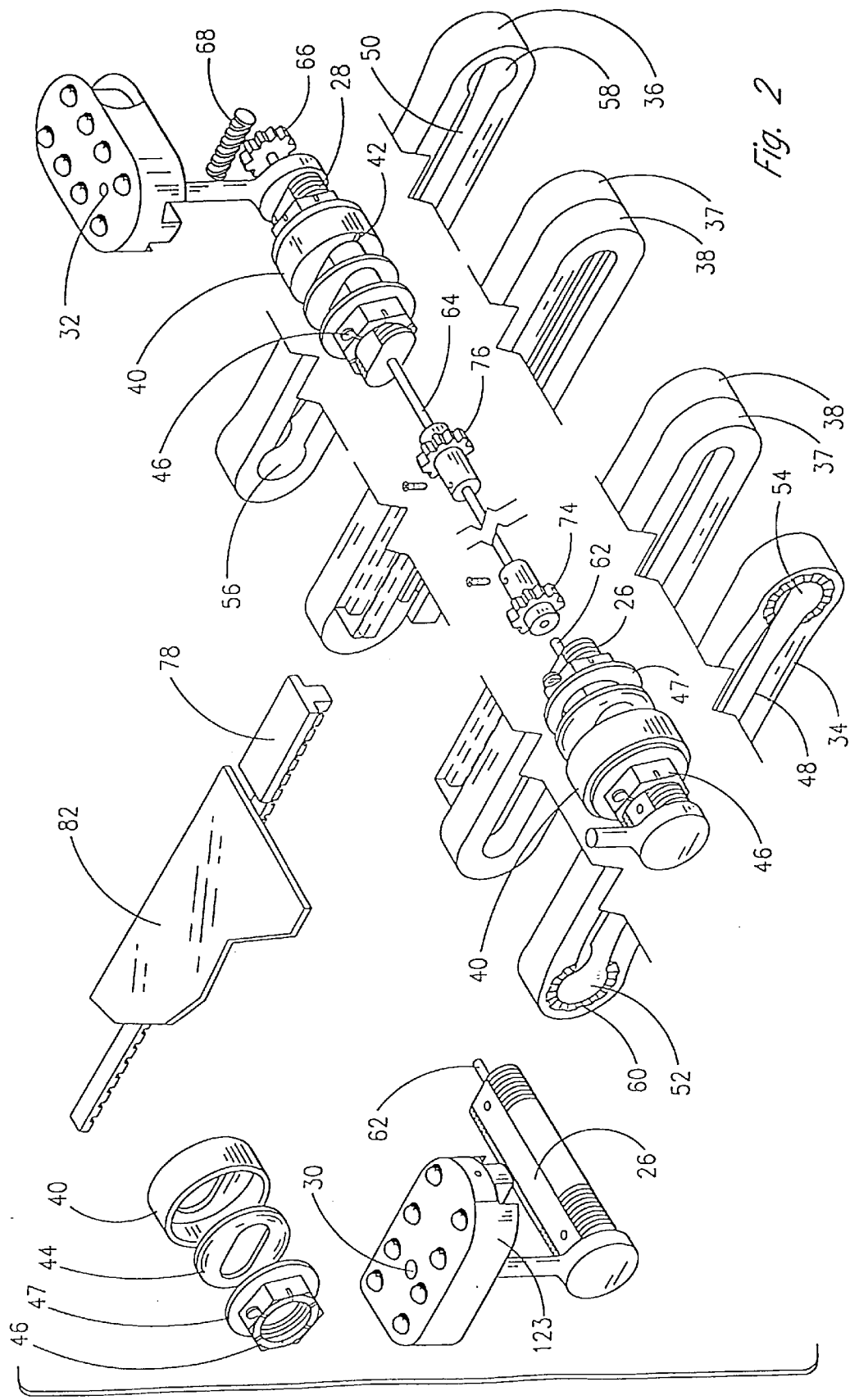
FIG. 2 is an exploded portions of the sunvisor shown in FIG. 1.

Each boot 26 and 28 resides within a guide support structure 34 and 36 which may be readily seen from the exploded view shown in FIG. 2. Each boot is substantially oblong in shape having a pair of opposed, flat surfaces. The boots can be threaded and readily seen in FIG. 2.

As will be appreciated from the present description, each boot remains stationary with respect to the sunvisor shell which moves thereabout. The guide support structure is surrounded by a spring cap 40 which has an oblong interior cut out and ribbed surface 42, a flat spring 44 and a king nut 46 upon the outer surface. On the inner surface the guide support structure has a flat washer 47 which has an oblong interior cut out and a king nut 46, all seen in FIG. 2.

Each guide support structure 34 and 36 includes an elongated slot 48 and 50, respectively. Upon at least one end of the slot is a flared circular opening. Slot 48 thus includes flared circular opening 52 and 54 while slot 50 includes flared circular openings 56 and 58.

The ribs on the spring cap 40 remain parallel to and within the elongated slot until the boot is within one of the flared circular openings.

As will be appreciated, the boot remains stationary and the sunvisor shell moves so that the slot moves in relation to the boot. When the boot is outside of the slot, in other words, in one of the flared circular openings, the ribs will mesh with receiving ribs 60 which are upon a raised surface. The spring cap will thus supply enough force to press the ribs against the receiving ribs on the guide support. The radial position of the sunvisor shell will thus remain in place until overcome by the user or by the force of the motor which will be described hereinafter.

Figure 3:
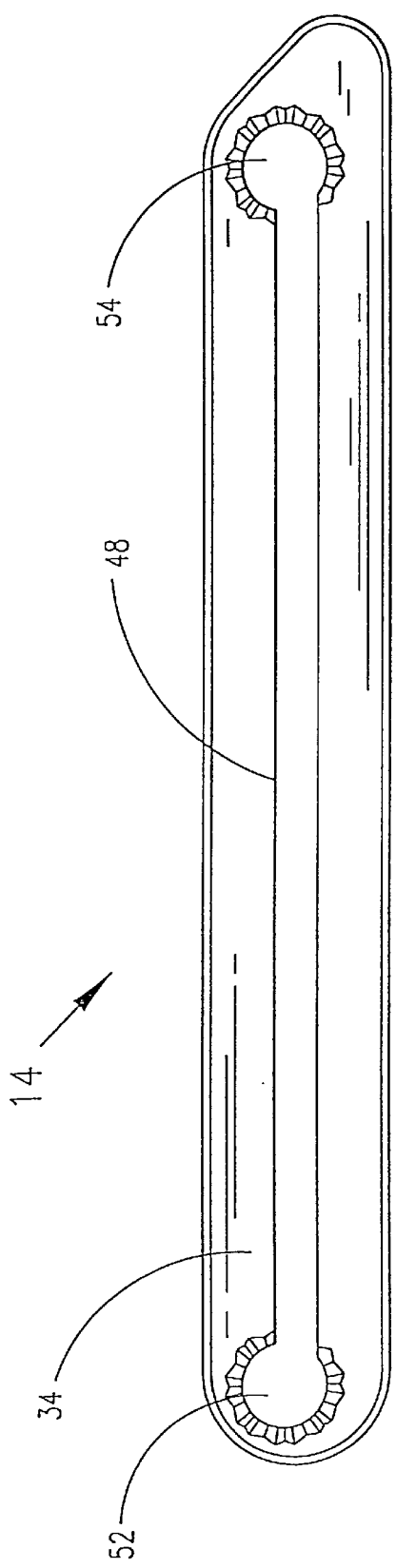
FIG. 3 is a side view of the sunvisor shown in FIG. 1.

FIG. 3 illustrates a side view of one of the guide support structures 34. The slot 48 is interior to sunvisor shell 14. The flared circular openings 52 and 54 are at opposite ends of the slot. The flared circular openings can be centered or offset. The exterior design or shape of the sunvisor shell may also be observed and is a matter of choice.

It will be appreciated that the exterior shape of the sunvisor shell may take other forms for aesthetic or other reasons.

With further reference to FIGS. 1 and 2, the gear drive mechanism in the present invention may be observed. Protruding outward from the end of the boot 26 is a short bearing rod 62. The bearing rod is received by a longitudinal hole in gear 74. Extending outward from the opposite boot 28 is a shaft 64 which passes through the boot 28 and is rotatable therein and extends to a gear 66. The gear is drivingly engaged with a worm gear 68. The worm gear is at the terminus of a rotatable, flexible shaft 70 as seen in FIG. 1. Any type of gear arrangement could be employed. The flexible shaft which comprises a core 124 and a casing 126 is rotated by a motor 72 such as a small electrical motor which might be recessed within the headliner or elsewhere within the vehicle. As shown in this embodiment, the flexible shaft slides within a slot 73 as the visor is moved laterally on the track. The motor would be powered by the electrical system (not shown) of the vehicle. It will be understood that other mechanisms might be utilized to rotate the shaft 64 such as hydraulic or pneumatic mechanisms.

Returning to a consideration of FIG. 2, the shaft 64 turns a pair of gears 74 and 76 which extend radially from the shaft and can be molded to the shaft or mounted as shown with set screws and divots in the rod.

Each gear 74 and 76 meshes with a rack 78 and 80. The gears rest in and are guided by elongated slots upon inner supports 90 and 92. Rotation of the shaft 64 by the motor will cause the gears 74 and 76 to rotate. Rotation of the gears will cause the racks 78 and 80 to move linearly.

In at least one embodiment, the rack remains stationary with respect to the sunvisor shell 14. As will be described herein, in other embodiments, the rack is flexible and movable to allow for extension or retraction of a glare shield. FIGS. 1 and 2 illustrate an embodiment with an extendible and retractable glare shield 82.

FIG. 4 is a sectional view taken along section line 4—4 of FIG. 1.

In the embodiment shown in FIG. 4, the glare shield 82 is attached to the racks 78 and 80. The racks are flexible and extend beyond the edge of the glare shield and are not permanently secured to the sunvisor shell. Rather, a switch 104 may be operated so that the rack is movable with respect to the shell or is stationary with respect to the shell. When the racks 78 and 80 are stationary with respect to the shell, the rotation of the gears 74 and 76 will cause the shell to move with respect to the boots. In the alternative, when the switch allows the racks to move, rotation of the gears 74 and 76 will cause the racks to move which will, in turn, cause linear movement of the glare shield 82. Depending upon the rotation of the gears, the glare shield will either extend from the shell or retract into the shell through slot opening 84.

The glare shield is retained between rack gear retaining rails 86 and support rails 88. Rack gear retaining rails 86 also serves as a guide for the flexible rack gear 78. They are upon the inner and upper surface of the sun visor shell and continue on around to the lower surface. Lateral movement of the glare shield 82 is prevented by supports 90 and 92.

FIG. 5 illustrates an alternate embodiment from those shown in FIGS. 1 through 4.

The embodiment shown in FIG. 5 also includes a glare shield 82. The gears 96 and 98 are shaped differently although they operate in the same manner. Additionally, a single lower rail 100 for each side of the glare shield is provided in a different position as well as a pair of rack gear retaining rails 102.

Returning to a consideration of the embodiment of the sunvisor 10 shown in FIGS. 1 through 4, the operation of the sunvisor shell and the glare shield 82 may be observed. When the drive gears 74 and 76 are rotated by rotation by the shaft 64, they engage with the teeth on the gear racks 78 and 80. To move the sunvisor shell 14 either forward or backward, the sunvisor shell is moved with relation to the boots 26 and 28 which slide within the slots 48 and 50. The boots 26 and 28 remain stationary at all times and the sunvisor shell itself moves with respect thereto. While the boots are in the slots, the sunvisor shell moves linearly with respect to the boots. When the boots are within either of the flared circular openings, the sunvisor shell moves radially with respect to the boots. The movement of the sunvisor shell is accomplished by the motor 72 which is controlled by a switch 104 as seen in FIG. 1. The switch may take various forms as are well known.

The sunvisor 10 also includes a solenoid 106 which operates a plunger 108 to extend or retract the plunger. The plunger may have an extension 110 with a spring 112. Upon the end of the extension is a small disc 109 which reduces friction for ease of sliding over the latch 114. When the plunger extension 110 is extended, the racks 78 and 80 are stationary with respect to the sunvisor shell 14. When the plunger extension 110 is retracted by operation of the solenoid 106, latch 114 is retracted and rotation of the gears 74 and 76 will move the racks 78 and 80. In this position, the racks 78 and 80 are free to move with respect to the sunvisor shell. Accordingly, the sunvisor shell will remain stationary because of the spring cap assembly 40 and the racks will move thereby moving the glare shield 82. The glare shield 82 will thus be extended or be retracted through the opening.

The spring 112 causes the extended plunger to remain extended except when energized. The solenoid 106 will also be controlled by the switch 104. It will be appreciated that either a linear or rotary solenoid or other switching mechanism might be employed.

An optional safety mechanism may be utilized. When the glare shield 82 is fully extended, the latch 114 extending from the glare shield will hit a plunger 116 of a stop switch 118 which interrupts power and stops movement of the glare shield. This prevents the glare shield from depending from the slot and further prevents the whole assembly from rotation and hitting the user.

The glare shield can be made of any light diffusing material. It may be somewhat opaque if to have an extended visor rather than glare shield is desired. Alternatively, a vanity mirror could be incorporated into the visor.

Figure 6:
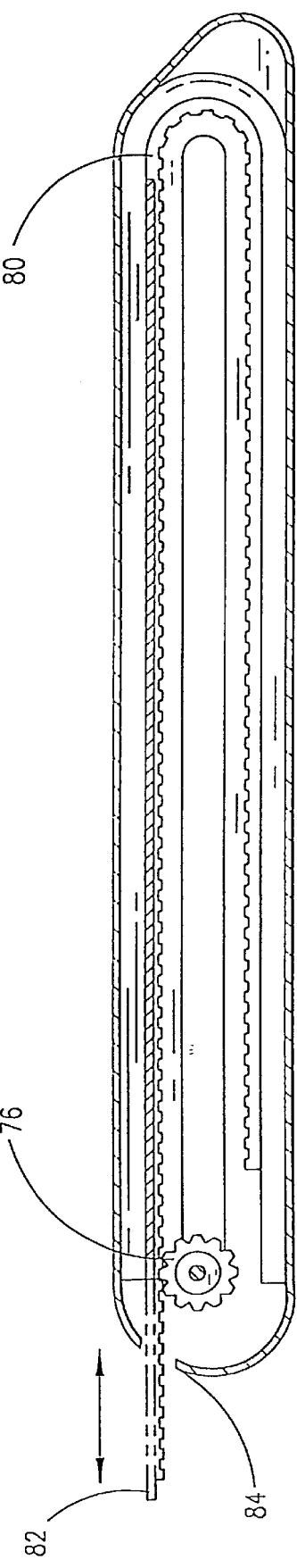
FIG. 6 is a sectional view taken along section line 6—6 of FIG. 1.
Figure 7:
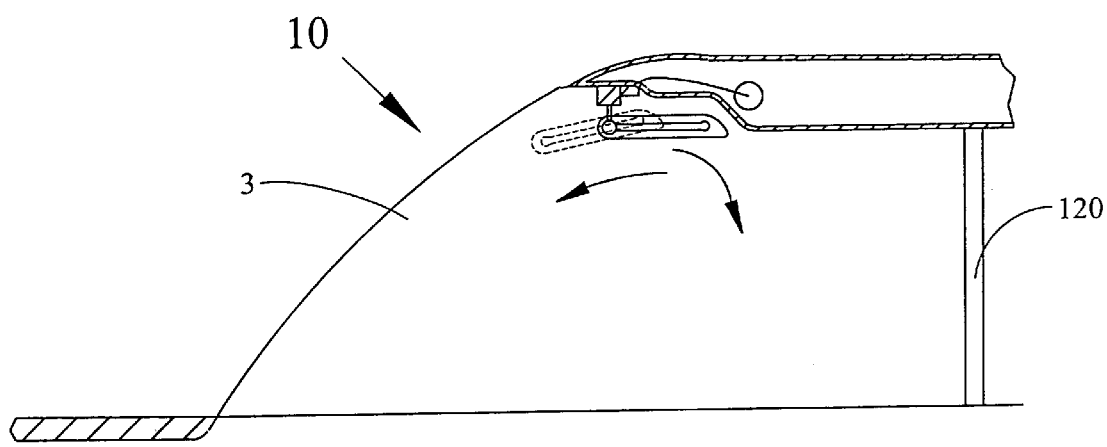
Figure 8:
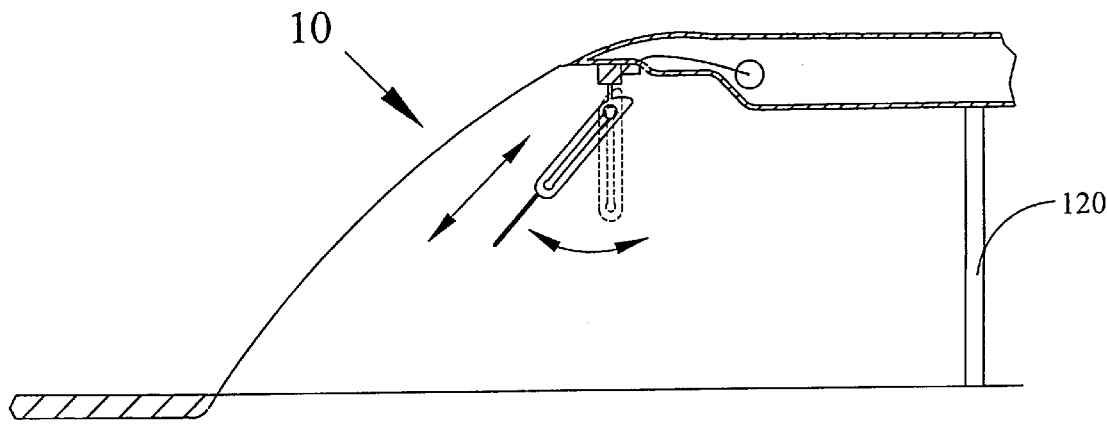

FIG. 6 shows a sectional view illustrating movement of the glare shield 82 which is taken along section line 6—6 of FIG. 1. In this view the glare shield 82 is partially deployed through slot opening 84. It can be seen that the flexible gear rack 76 and 80 are moved in their rack gear retaining rails 86 and 88 as the glare shield is extended or retracted. FIGS. 7 and 8 show the operation of the sun visor 10 with respect to a vehicle 120. FIG. 7 illustrates the linear movement of the sunvisor shell with respect to the boots 26 and 28. Also shown as an optional placement is the motor and flexible shaft.

FIG. 8 illustrates the radial movement of the sunvisor shell while the boots are within one of the flared circular openings.

Figure 9:
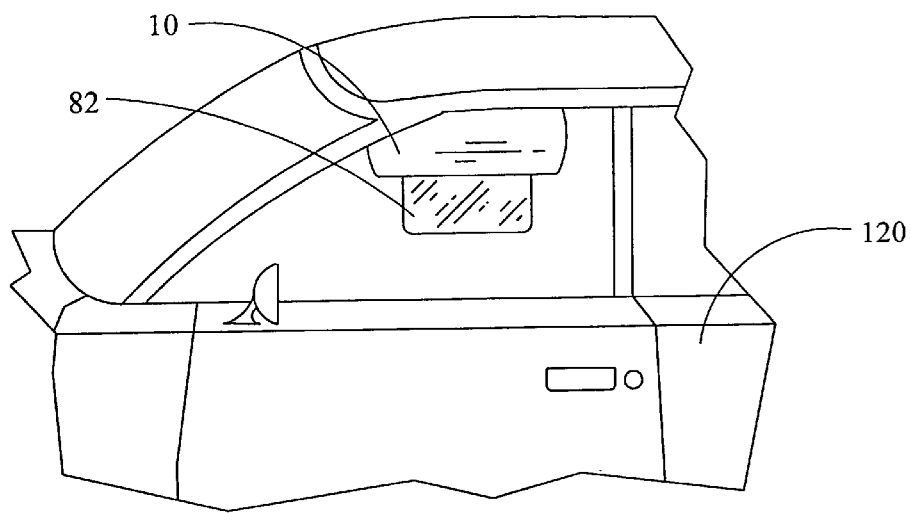
FIGS. 7, 8 and 9 are simplified diagrams showing the use and positioning of the sunvisor with respect to a vehicle.

Finally, FIG. 9 illustrates movement of the sunvisor shell on the track assembly (not seen in FIG. 9) so that the shell has moved over to the passenger side window. Additionally, FIG. 9 shows the glare shield 82 in the extended position.

Returning to a consideration of FIG. 1, the operation of the sunvisor shell 14 with respect to the track assembly 16 may be observed. The sunvisor shell 14 moves upon the track 18 as described. The shell 14 is supported between boot arms 22 and 24 respectively. The boot arms are pivotally mounted to block housings 142 and 144, respectively. The block housings are allowed to slide within the track housing 18. The arms travel up into the track housings through a track slot 122 which is visible where the track 18 has been cut-away.

To activate the sunvisor, the user pushes a button switch on the control panel 104. The control panel 104 permits electrical energy to pass to the track motor 170, which can be remotely placed in the vehicle. The track motor 170 has a flexible shaft 124 attached to it which rotates within a flexible housing 126. As the flexible shaft 124 rotates it turns the drive gear 148 (which is shown out of and to the right of the track corner housing 180). The drive gear 148 has a top gear 178 molded on it that meshes with a worm gear on the end of the flexible shaft 126 (not shown).

As the worm gear turns the drive gear 148, gear pixels 182 mesh with the drive belt 146 and move it. The drive belt is a flexible, elongatable material that wraps around block housings 142 and 144. The drive belt is secured upon at least one housing by an end cap 143 (also see FIG. 2).

As shown in FIG. 1, the belt has receiving holes but it is understood that it could be ribbed or have any number of other surfaces necessary to create friction between it and the gear.

As the drive belt 146 is driven, the leading arm 22 of the sunvisor is pushed down the track side 20.

The track sides 18 and 20 substantially form a right angle triangle. As the sunvisor shell goes around the corner, the distance within the track between the arms increases and the belt will stretch to accommodate this. At the halfway point around the track, the gear 148 now starts to pull the trailing arm 24 down the track side 18 which in turn is now pushing the leading arm 22 down the track side 20. The mechanism includes both a pushing and pulling action. The gear 148 must first push the leading block 142 approximately half way down track side 20 and then gear 148 starts to pull the trailing block 144 on to the corner of the track until the sunvisor 14 is parallel to one of the side windows.

A corner belt guide 184 prevents the belt from collapsing on itself at the corner. Block 144 is always in the forward track and cannot negotiate the corner; therefore, when the user pushes the button switch 104, the visor will only travel as far as the corner and then stop. Likewise, the block 142 always stays in side track 20.

Optionally, a limiter switch (not shown) could be placed in the track assembly which, once activated by one of the boots, would shut off the motor.

To allow each block to move easily within the track, each block has receiving indentations or holes 186 which have small bearings 188 placed within them, half on top and half on the bottom of each side of the block. These allow the block to roll effortlessly along the track. In the rest position or home, the sunvisor has a rearward overhang and is causing the greatest force upon the front top bearings and on the lower rear bearing. When the sunvisor is slid forward it has a forward overhang and is causing the greatest force upon the rear top bearings and the forward lower bearings.

Figure 10:
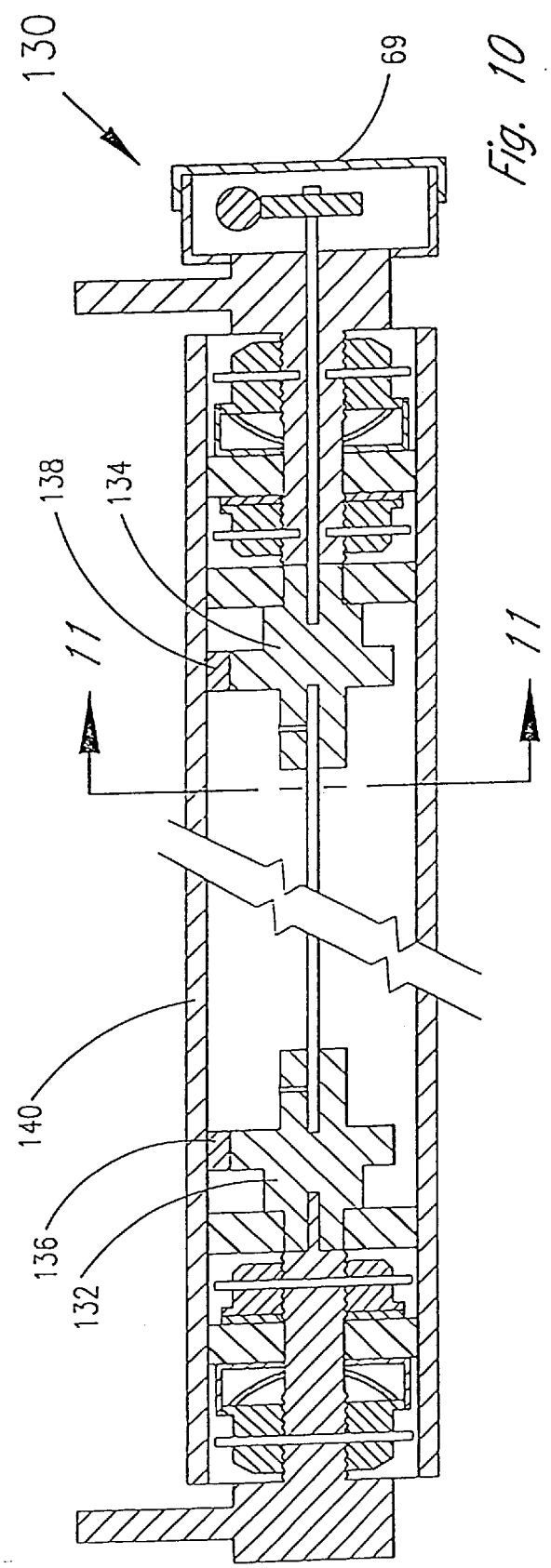
FIG. 10 is a sectional view of an alternate embodiment of the sunvisor without a glare shield.

FIG. 10 illustrates an alternate embodiment 130 of the sunvisor without a glare shield. The gears 132 and 134 engage with racks 136 and 138 which are secured to the sunvisor shell 140.

Figure 11:
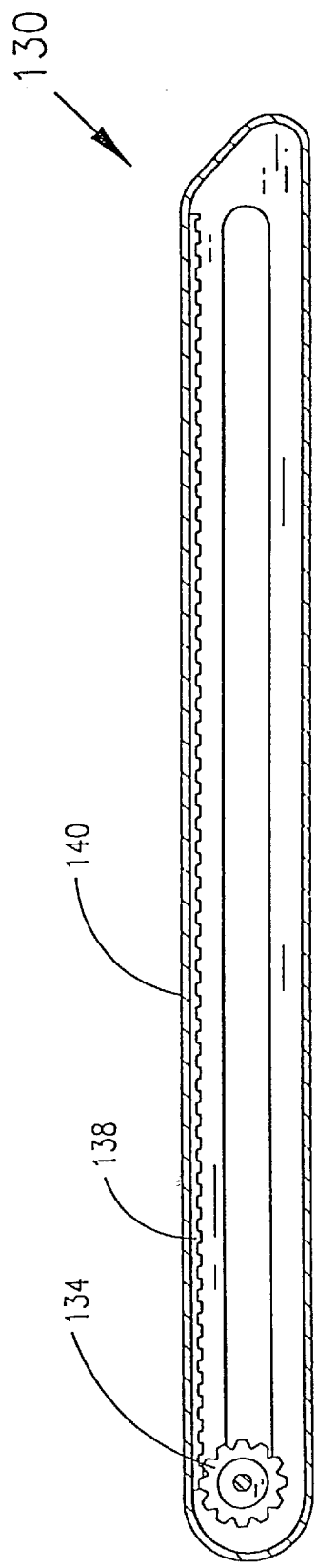
FIG. 11 is a sectional view taken along section line 11—11 of FIG. 10.

FIG. 11 illustrates a sectional view taken along line 11—11 of FIG. 10 and shows a fixed gear rack upon the top of housing.

Figure 12:
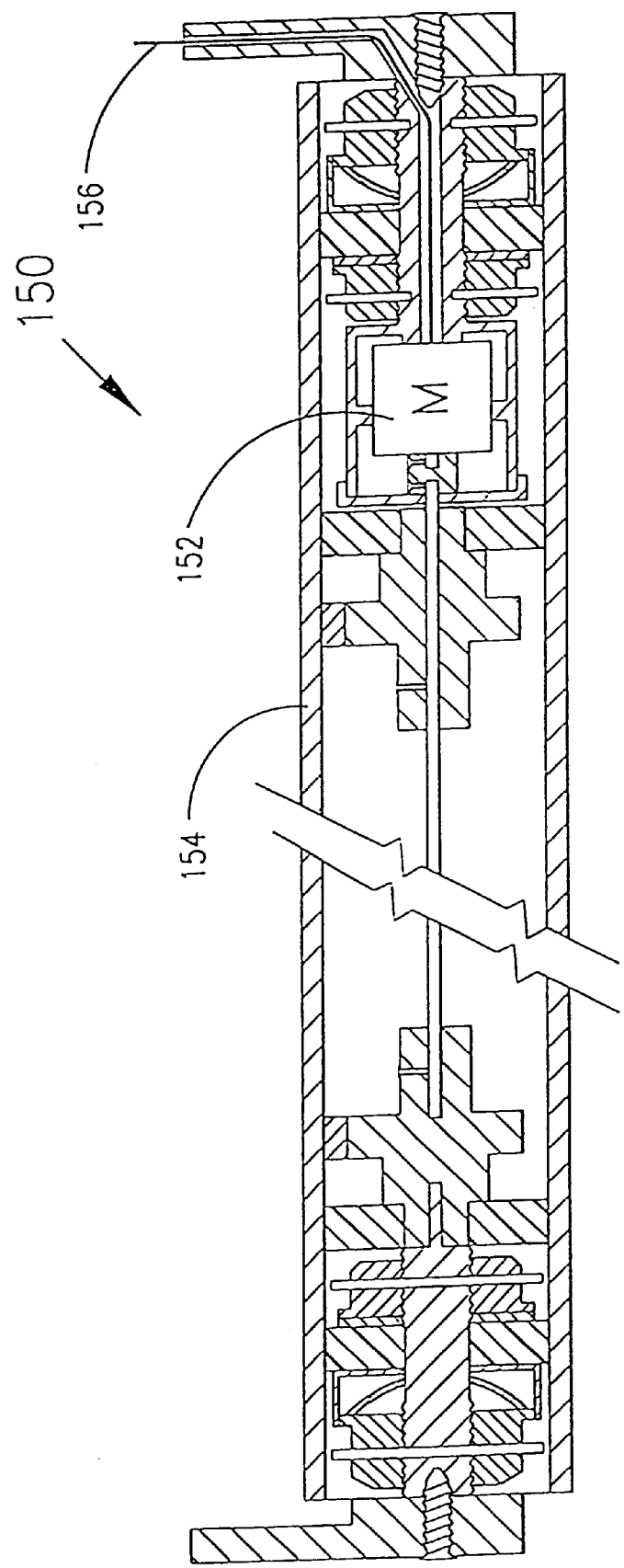
FIG. 12 is an alternate embodiment of the sunvisor without a glare shield and with the motor located within the sunvisor shell.

FIG. 12 illustrates a further embodiment of the sunvisor 150 without a glare shield. The motor 152 is located wholly within the sunvisor shell 154. The motor 152 would be supplied with electricity via line 156. The sunvisor 150 would operate substantially as in the other embodiments.

Within the spirit and scope of the present invention, alternate embodiments of the track assembly are possible. FIG. 17 illustrates an alternate track assembly 250.

In this embodiment, the visor track assembly 250 has a reduced number of moving parts. The visor shell moves to the side window position by being pulled by a flexible shaft, cord, or strand with engagement racks attached to the flexible shaft. In a preferred embodiment, it is simple in operation and extremely reliable for moving the visor shell between the front position to the side position.

As seen in FIG. 17, it works on the principal of two arms being pulled or pushed at different times by the engagement mechanism.

To activate, the user pushes a switch 252 which activates a reversible motor 254 which turns a pulley 256. As the pulley is turned, it will either push the flexible shaft 258 inside of its flexible but rigid housing 260, or pull the shaft 258 in the housing. The pulley 256 is inside a pulley housing 262 which keeps the cord wound but releasable. When the flexible shaft 258 is wound on the pulley 256, the housing is not needed as the shaft would just wind on the pulley.

The visor shell 265 starts in the home position aligned with the front position. In this position, the shaft 258 is held within a receiving contour 264 and continues along the center of the left or right side and continues on around the front side of the track to the opposite end of the track. It will be observed that the receiving contour is partially cylindrical in nature and partially torroidal in nature.

The flexible shaft 258 includes two engagement racks 266 and 268, respectively. The engagement racks are cylindrical in nature with teeth on the front and a slot along the back. They can be crimped on or secured to the flexible shaft. In the fully forward position, engagement rack 266 is in front of and aligned with carriage 270. The carriage has receiving holes 280 for bearings 282 which allow for easier sliding. The carriages have engagement teeth 284 on one side. In this position, the engagement rack and carriage are not in contact with each other. When activated, the flexible shaft 258 is pulled in and along the contour 264 and is wound upon the pulley 256 which is driven by the motor. As the flexible shaft 258 is pulled along, at first, the leading arm carriage 272 is in contact with the engagement rack 268 which is moved by the flexible shaft. Each carriage 270 and 272 have extending teeth capable of engaging with racks 266 and 268, respectively.

At first, the leading arm is travelling in a linear path while the trailing arm is mostly pivoting as the visor goes around the corner. The leading arm is initially travelling faster than the trailing arm. Initially, engagement rack 266 will actually pass trailing carriage 270 and will no longer be aligned with it. It is spaced from and free from contact with the trailing arm until approximately half way down the front side. As the leading carriage 272 nears the center of the side, it starts to slow as the visor reaches the half way point of being to the side window. It also reaches an outward contour upon the front side of the track wall. This contour draws the cord 258 and engagement rack 268 upon the cord 258 away from the leading arm carriage 272. The leading arm carriage is now spaced from the rack and free from engagement. Just prior to this, the trailing edge carriage is reaching the contour along the front side of the front track. This section is contoured inward and causes the cord 258 with the engagement rack 266 to engage trailing carriage 270. Now the trailing carriage arm is starting to travel in a more linear path and is speeding up while at the same time the leading arm carriage 272 is slowing down and pivoting more. The visor shell, thus, will be moved into a position relatively parallel to the side window. When the visor arm reaches the end of slot 274, it will stop.

Optionally, a limiter or stop switch could be incorporated into the track which would be tripped and stop the visor. During this movement of the visor, the cord 258 is pulled and wound upon the pulley 256 which can be placed in a remote location. When the visor is returned to the forward position, the cord is being pushed or unravelled off of the pulley 256. There is a casing or housing 262 around the pulley with a hole or slot to release the cord 258 as it is unravelled. The cord is surrounded by a semi-rigid flexible housing which selves to guide the cord as it is unwound from the pulley 256.

When it is unwound, the operation of above is reversed. In this manner, both arms cannot be engaged at the same time. The track sides 18 and 20 substantially form a right angle. Along with visor shell 265, they form the hypotenuse of a right angle triangle. The length of the right angle leg is the distance from the corner to the carriage. Since the length of the hypotenuse doesn't change, the right angle legs change with respect to each other. Accordingly, the arms are travelling at varying speeds as the visor shell moves. The distance between the two arms within the track housing increases as the visor nears the center of the turn and then the distance decreases.

An alternate embodiment of the sunvisor 160 is shown in FIGS. 13 and 14. The sunvisor shell 162 will be moved manually with respect to the boots 164 and 166.

FIG. 14 is a sectional view taken along line 14—14 of FIG. 13.

In this embodiment, the boots 164 and 166 are upon the shaft and fixedly mounted to the shaft which also serves as a visor roof support.

FIGS. 15 and 16 illustrate a further alternate embodiment of a sunvisor 200 that may be moved manually.

A sunvisor shell 201 slides forward and rearward upon a support rod 202 which is curved at one end and terminates in a bracket 204 which travels in a track 805. The support rod 202 is round in shape and has a lower end 883 and an upper end 837. The ends are formed by bending the rod leaving approximately a 90° angle. The rod has a hollow interior along its longitudinal length and has an opening 884 through which electrical wires can be placed. The support rod upper end travels up through a round bracket collar hole 887 in the bracket assembly 204. The support rod has a plastic cover for looks, covering the outer surface of the support rod near the angled portion. The cover stops just below the round bracket collar hole in the bracket. The support rod has a circumference just smaller than the diameter of the bracket collar opening. The upper end of the support rod is held perpendicular to the bracket, in the bracket collar hole, as the bracket thickness creates a opening that has enough of a hollow vertical shaft for the upper end of the support rod to be held vertically in the opening. The bracket assembly 204 is comprised of the bracket that has a rectangular bottom side 889, two side walls 891 and 892 respectively which are formed off of the longitudinal edges of the bottom side. The side walls are formed and are generally perpendicular to the bottom sides surface and have surfaces that are parallel each other. The side walls are contoured longitudinally inward toward the center of the bracket and therefore have outside walls that allow for bearings 215 to be placed. Bearing holes 214 are placed along the contour of the brackets side walls, and the bearings when assembled are placed and rotate within these bearing holes. This allows the bracket to be suspended within the track and to slide easily within the track 805. The electrical wire is attached to the vanity mirror lighting by common known means and is run through the shell to the hollow support rods hole 884 and up through the hollow support rod. The electrical wire then continues up through and out the upper end of the support rod and then is attached with female/male connectors or soldered to the contacts 230 on the top surface of the bottom of the bracket. Power is supplied to the sunvisors lighted mirror with electrical connector 234 which is supplied power by the vehicles battery. The connector is riveted to the track and the connector has two electrical strips 813 on the bottom which when in place will contact the bracket electrical contacts 230 when the sunvisor is slid to the rested position with the longitudinal edges of the shell parallel a front windshield.

The bracket assembly 204 is placed within the track assembly 805. The track has a top side 880. From an end view, the track would resemble a semi-closed flat sided C with an opening along the entire top side.

The front edge of the track is adjacent and generally parallel a headliners front edge and also a front windshield of the vehicle (not seen). The longitudinal sides of the track could be placed along a front side window. In this version, the tracks longitudinal sides are along the front edge of the headliner. The track has two ends; an outer end 851 and an inner end 849. The inner end would be mounted near the center of a vehicle while the outer end is near a front side window. In this version it would be the drivers side window. The track has two side walls side wall 897 and an opposing side wall which are formed from the longitudinal edge of the top side. The side walls are generally perpendicular to the top side. The width of the side walls is narrow and is defined by the perpendicular distance to the longitudinal edges of the top of the track and the bottom longitudinal edge of the side wall. The side walls surface is contoured outward from the tracks interior so as to allow bearings to be placed upon their interior wall. This allows the bracket to roll easily within the track. The side walls lower longitudinal edges now curve around to form the bottom side of the track.

Now the support rod can be slid into place. The support rod is placed through the bracket collar hole. The upper end of the support rods longitudinal axis is now perpendicular to the bracket bottom. A retention washer 220 which has a round exterior and a hole through which the rod can be slipped is put into place. The retention washer has two rectangular protrusions 228 that extend outward from the inner edge of the retention clip hole. The protrusion fit within matching channels 229 contoured in the support rod. The channels begin at the top of the support rod and extend down longitudinally around the rods outer surface. The channels are rectangular in shape and match the shape of the protrusions 228 and therefore keep the retention washer from turning about the rod. On the bottom side of the retention washer are small triangular protrusions 222 extending down from the bottom side of the retention washer. The protrusions fit down into the raised triangular indentations 216 in the bracket bottoms top side. When assembled the retention washer is pressed against the top side of the bottom of the bracket. The retention washers triangular protrusions are pushed down into the triangular indentations 216 by a small wave spring 226 which is pressed between the machine pressed top 224 of the rod and between the top of the retention washer. The support rod is held in place in the bracket by compressing the top of the rod 224. In the rested position, the retention washer causes the visor to remain parallel the windshield as the visor shell is slid forward over a clamp assembly. The rod will turn as the user can overcome the small wave spring force and can turn the visor to the side when grabbing the outer end of the sunvisor shell.

The bracket is slid into the outer end of the track. The bearings 215 are placed as the bracket is slid into the open end of the track. Once the bracket is in place, the stop tabs 236 placed at each end of the track can be bent down into place preventing the bracket from sliding back out of the tracks ends. The Sunvisor assembly could then be mounted in a vehicles headliner which Would be slotted; therefore allowing the sunvisors support rod to extend into the interior of the vehicle so the sunvisors shell could be used. The sunvisor assembly shown in FIGS. 15 and 16 is a driver's side visor; the passenger's side would be reversed. The sunvisor shell 201 has a forward leading edge 240 which lies parallel and adjacent the windshield (not shown) in the rested position. The shell has a top side 271 which is generally rectangular in shape and is formed by the forward leading edge being one of the longitudinal sides; and a trailing edge 241 parallel to the forward leading edge and being the other longitudinal side of the visor shell. The ends of the shell are formed by an outer flexible end 299 and an inner visor arm end 242. The shell's bottom side 269 which is seen through the mirror cutout has the same shape as the top side of the shell, is below and lies on a plane that is parallel the top side of the shell. This creates a cavity within the shell. The shell may be molded with a living hinge which is the trailing edge 241; this allows the shell to be folded together over the support rod 202. The shell is snapped together along the forward leading edge snap points 265 using common methods of closure.

The ends of the shell 299 and 242 are generally perpendicular to the forward leading edge 240. The outer flexible end 299 is formed with a curvature to create a shape that keeps the sun from shining in at the upper corner of the windshield. The shape would vary based upon the vehicle. The inner visor arm end 242 is formed when the top and bottom sides of the shell are folded together creating an elongated opening in the inner visor arm end 242. The inner visor arm end 242 now has an elongated opening which is perpendicular to the forward leading edge 240 of the shell. The support rod 202 passes through the elongated opening in the end of the shell. The support rod is between the top side 271 and the bottom side 269 of the visor shell and is parallel to the forward leading edge of the shell but perpendicular to the inner visor arm end 242.

Within the interior of the shell 201 is a molded elongated clamp support 208. The elongated clamp support may be a molded part of the interior of the top and bottom sides of the shell. The elongated clamp support creates an oblong slot 297 in which a clamp 206 can slide. The oblong slot lies perpendicular to the longitudinal sides of the visor shell beginning near the forward leading edge 240 and continuing toward the trailing edge 241 of the shell. The oblong slot's longitudinal sides lie generally parallel and adjacent to the inner visor arm end 242 of the visor shell. The elongated clamp support's 208 inner surface is created by molding the surface thicker than the shell thereby creating a shelf 276. The shelf is created on the inner side of the top and on the inner side of the bottom of the shell housing. The shelf surface is parallel to the shells top and bottom sides. The width of the shelf area matches the clamp 206 and therefore creates a slot in which the clamp may slide.

FIG. 23 is a sectional view taken along section line 23—23 of FIG. 15. The support rod 202 is a lengthened piece of metal that has a round exterior. The clamp 206 is formed of a pretreated metal and exerts a spring force that compresses against the support rod 202. The clamp is molded as one piece. The clamp has a top side 298 which has an inner surface 286 and an outer surface 207. The clamp has a back longitudinal edge which is molded as an arc that curves from the top side and continues around generally perpendicular to the top surface 298 and continues until it is again parallel to top side 298. This creates a bottom side 288 which is now parallel and below the top surface. The bottom side 288 has an inner surface 287 and an outer surface 276. The top and bottom sides of the clamp are sufficiently wide as to allow the shell to slide easily forward and rearward over the clamp. The front side of the clamp is open with the top sides leading edge 283 being curved inward and the clamps bottom sides leading edge 269 being curved inward thus assuring the shell will slide easily over the clamps surface. A hole is formed through each end of the clamp, creating an opening through which the support rod 202 can be slid. The support rod is slid through one of the end holes and is forced between the clamps top side 298 inner surface 286 and the clamps bottom surfaces 288 inner surface 287. The clamps top surface and bottom surface create compressive force against the rod. The force is sufficient to hold the visor shell in place parallel to a headliner but can be overcome by the user when the visor is rotated upon the rod into an in-use position. The clamp thus rotates radially about the axis of the rod.

Upon the longitudinal surface of the support rod is a chamfered section that creates a flat surface 281. The flat surface runs longitudinally along the rod and causes the clamp 206 to snap into place around the flat surface when the visor shell 201 is rotated toward the rested position. The flat surface 281 position is dependent upon the vehicles roofline rake. The flat surface created is generally parallel to the headliner's surface.

With the clamp in place around the support rod, the visor shell top inner shelf surface 277 and the visor shell bottom inner shelf surface 257 creates a surface upon which the clamp 206 can now slide forward toward the leading edge 240 of the visor shell or rearward toward the trailing edge 241 of the visor shell. The visor shell is sliding forward and rearward over the clamp top side 298 outer surface 207 and over the clamp bottom side 288 outer surface.

The clamps longitudinal sides lie parallel to the forward leading edge 240 and parallel the trailing edge 241 of the visor shell. The support rod 202 also lies parallel to the forward leading edge and parallel to the trailing edge of the visor shell; and remains stationary as the visor shell 201 is slid forward and rearward over the clamp 206. The visor shells ends are being slid forward and rearward perpendicular to the rod and perpendicular to the clamp.

FIG. 16 shows several elements exploded. Interior to the clamp 206 is a flat washer 211 which is oblong in shape with a hole 279 offset and formed through its side. Interior to the flat washer 211 is a spring washer 212 which also has a hole 290 formed through its surface. Interior to the spring washer 212 is a travel guide 210 which can be a molded oblong plastic piece with a hole 291 formed and offset through its surface.

Referring back to FIG. 15, the rod is slid through a hole 289 in the end of the clamp. The travel guide, the spring washer and the flat washer are slid over the rod and into place between the clamp support 208 and an inner support 209.

As the visor is pivoted down into use, the offset hole allows the visor to rotate radially closer to the trailing edge. This allows the trailing edge 241 to pivot without interfering with the headliner.

Interior to the clamp support 208 is the inner support 209 which lies parallel and adjacent to the clamp support. The inner support is a molded part of the shell interior and when the shell is folded shut, a slot 296 is formed through which the visor rod 202 can slide.

The elongated clamp support 208 and the inner support 209 lie parallel each other and perpendicular to the forward leading edge of the visor. A space is in-between the longitudinal sides of the inner support and the clamp support. An inner side surface 295 of the clamp support 208 and the outer side surface 294 of the inner support 209 creates a space in which the travel guide 210 can slide.

The spring washer 212 forces the travel guide 201 against the inner support's outer side surface 294 and the spring washer 212 forces the flat washer 211 against the clamp support's inner side surface 295. The spring washer 211 provides just enough pressure to keep the travel guide and flat washer against the clamp support and the inner support but the force can be overcome by the user and therefore the visor shell will slide forward and rearward over the assembly. The travel guide 210 keeps the visor from wracking itself as it is slid forward and rearward. In other words the travel guide keeps the visor shell ends perpendicular to the clamp and support rod as the visor shell is slid forward and rearward over the rod. The travel guide and the flat washer also cause friction against the clamp support and the inner support, keeping the visor from sliding forward or rearward upon the clamp except by user force.

The support rod 202 is offset or bent leaving an elbow 267 just inside the inner support. The support rod continues on parallel to the visor shell top and bottom sides until just prior to the second inner support 209 which is identical to the other inner support. The support rod then curves back up at elbow 263 and the rod continues on parallel to the visor shell top and bottom sides into and through the holes drilled in the travel guide 210 the spring washer 212 and the flat spring 211. The travel guide, the spring washer and the flat spring are between the second inner support and the second clamp support. The support rod continues on into and through the second clamp 206. The clamp 206 slides in the oblong slot created by the clamp assembly structure.

The visor shell thus has both a linear movement and a radial movement. The user simply reaches up and pushes the trailing edge 241 of the visor forward and the visor shell will slide forward toward the windshield. When all the way forward, the user rotates the visor radially down into use and the clamp 206 and shell will rotate about the rod. The clamp's spring compression force is sufficient to hold the visor shell from rotation when not in use, but user force can overcome the spring force of the clamp upon the rod.

The bracket 204 fits in the track 205. Upon the side edges are receiving holes 214 for bearings 215 which allow the visor to travel easily within the track. The side walls of the bracket are contoured to receive the bearings. This embodiment may be center mounted in the vehicle with the pivot joint near the rear view mirror. With the center mount, the user will not be as apt to have to move his or her head out of the way when moving the visor to the side window position.

The visor shell may be pivoted to the side window or back to the front. Upon the bracket 204 are receiving contours 216 and 218 which indentations in the carriage which mesh with the formed ring 220 which has divots or raised bumps or protuberances 222. Immediately above the ring 220 is a flat spring 226 which pushes down on the formed ring 220. The ring 220 is slid over the rod 202 prior to flaring the end. It will be noted that the ring on the inner side has indentations 228 which match slots 229 in the rod 202. The prevents the ring from turning upon the rod.

In the at rest or home position aligned with the windshield, the divots 222 and contours 216 hold the visor parallel to the front windshield when the visor is being slid forward on the rod. The same is true for the side window as noted. There is at least one contour at 90° on the bracket and the visor rod is held parallel to the side window position allowing the user to slide the visor shell forward or rearward over the rod. The flat spring 226 force can be overcome by the user but is sufficient to hold the visor in place when being slid forward or rearward on the rod.

This visor provides a bearing means which addresses the need for stability, reduced vibration, strength in design and simplicity. Upon the carriage can be placed electrical contacts 230 which can then be attached to wires 232 for placement of a lighted mirror. When the visor is in the at rest or home position, the user would rotate the mirror downward for use. In the rest position, the carriage 204 is all the way to the right in the track 200 which has a receiving electrical connection 234 which supplies power to the contacts 230. Stop tabs 236 keep the carriage within the track after assembled.

Figure 18:
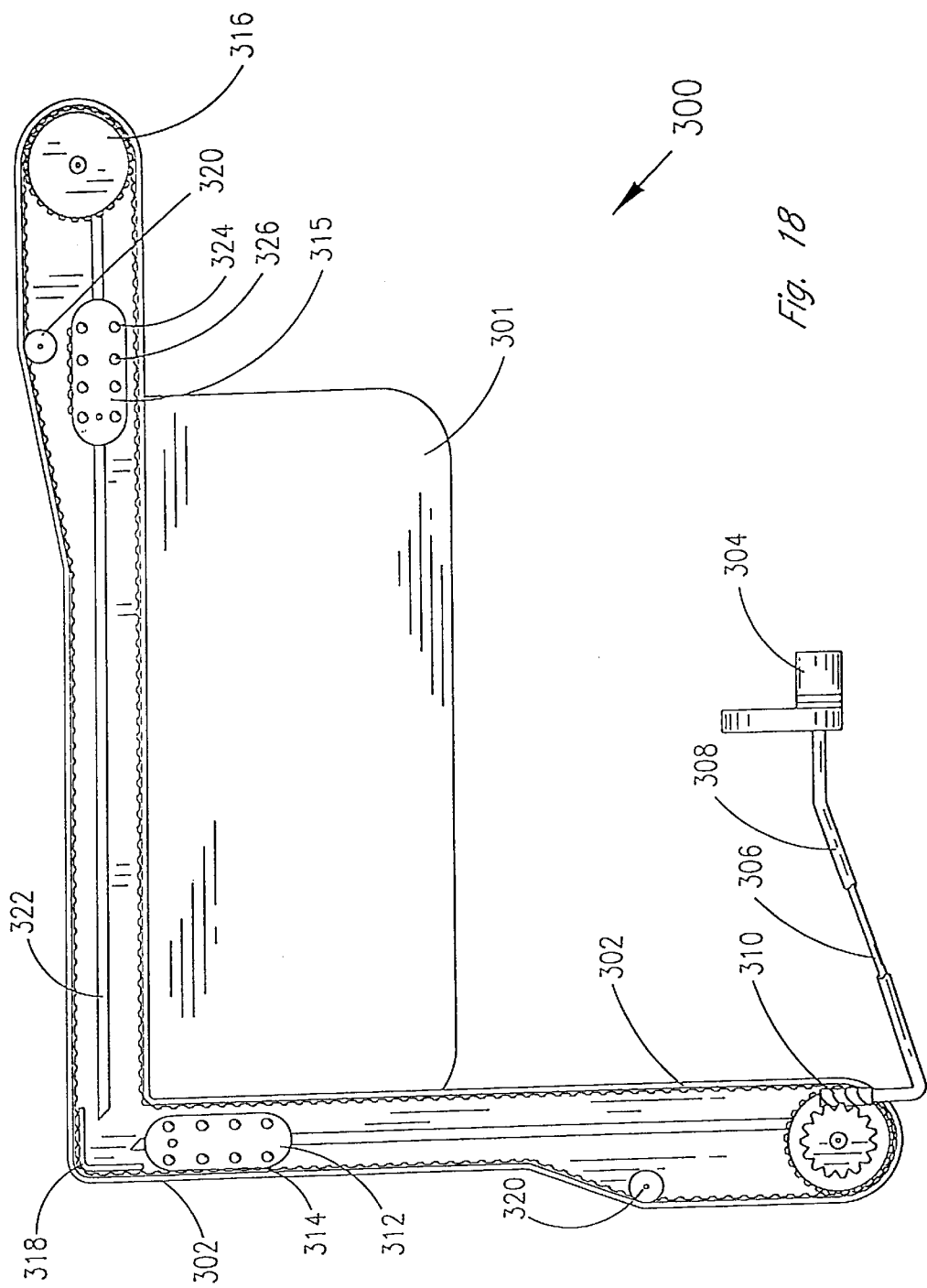
FIG. 18 is a sectional view of a further alternate embodiment of the track assembly for the present invention.

A further alternate track assembly 300 is illustrated in FIG. 18. In this track assembly, the track housing 302 is formed to allow a continuous belt to travel upon a path that will push and pull carriages at the appropriate times. In the figure shown, the visor shell 301 is nearly in the at rest or home position. When the motor 304 is activated, it turns a flexible shaft 306 which is within a flexible housing 308, which turns a drive gear 310. The drive gear 310 has a molded gear upon it which meshes with a worm gear of the flexible shaft. When the drive gear is turned, it drives the belt within the contoured and formed track. In the at rest or home position, the carriage 312 has teeth or a meshing surface 314 in contact with the belt and is pulled along within the housing. At approximately the halfway point, carriage 312 is freed from and spaced from the belt as the belt curves out away from the block 312. The teeth of block 315 teeth now mesh with the forward contoured area of the track and now this block is pulled along within the housing until the visor is to the side window position. A pulley 316 is placed at the other end of the track and the belt wraps around it.

There is a corner belt guide 318 which guides the belt around the corner of the track and can be molded into the track housing. The belt travels behind belt guides 320 after it leaves the inward contoured area. These guides separate the belt from the block and block gear rack 314. There is a slot 322 at the bottom of the track through which the visor arms pass.

The carriage has indentations or holes 324 which receive bearings 326 which allow the carriages to move easily within the track housing.

FIGS. 19 and 20 illustrate another further alternate embodiment of a sunvisor 400 that may be moved manually. A sunvisor shell 401 slides forward and rearward upon a support rod 402 which is curved at one end and terminates in a bracket 404 which travels in a track 405. The sunvisor assembly shown in FIGS. 19 and 20 is a driver's side visor; the passenger's side would be reversed. The sunvisor shell 401 can be molded of plastic or any similar material and has a forward leading edge 440 which lies parallel and adjacent the windshield (not shown) in the rested position. The shell has a top side 471 which is generally rectangular in shape and is formed by the forward leading edge being one of the longitudinal sides; and a trailing edge 441 parallel to the forward leading edge and being the other longitudinal side of the visor shell. The ends of the visor shell are formed by an outer flexible end 499 and an inner visor arm end 442. The shell's bottom side 469, which is seen through the mirror cutout, has the same shape as the top side of the shell, is below and lies on a plane which is parallel the top side of the shell. This creates a cavity within the shell. The shell may be molded with a living hinge which in this embodiment is the forward leading edge 440; this allows the shell to be folded together over the support rod 402. As shown, the visor shell could be molded with just the inner visor arm end 442 being hinged. The shell is then snapped together along the trailing edge snap points 465 using common methods of closure.

The ends of the shell are generally perpendicular to the forward leading edge 440 and consist of the outer flexible end 499 which is formed with a curvature to create a shape that keeps the sun from shining in at the upper corner of the windshield. The other end of the shell is the inner visor arm end 442 which is formed when the top and bottom sides of the shell are folded together, creating an elongated opening in the inner visor arm end 442. The inner visor arm end 442 now has the elongated opening that is perpendicular to the forward leading edge 440 of the shell. The support rod 402 passes through the elongated opening in the end of the shell. The support rod is between the top side 471 and the bottom side 469 of the visor shell and is parallel to the forward leading edge of the shell but perpendicular to the inner visor arm end 442.

Within the interior of the shell 401 is a molded elongated clamp support structure 408. The elongated clamp support structure is a molded part of the interior of the top and bottom sides of the shell. The elongated clamp support has a lower outer support rail 495 and an opposed upper outer support rail 453. The support rails are molded as a part of the inside of the bottom side 469 of the visor shell and a part of the inside of the top side 471 of the visor shell. A ledge 467 is formed on the interior side of the lower outer support rail 453 and runs perpendicular to the forward leading edge 440 of the visor shell. Looking now at the lower outer support 495, the ledge 467 begins at the forward leading edge and continues toward the back trailing edge 441 of the visor shell. The ledge is adjacent to and generally parallel to the inner visor arm end 442. The ledge has an integral longitudinal edge 410 molded to the shell bottom 469 which runs linearly perpendicular to the forward leading edge of the visor shell. A top longitudinal edge 411 of the flat ledge runs parallel the bottom edge and has been molded raised up off the inside of the bottom side 469 of the shell. The ledge 467 is angled transverse the bottom side 469 of the shell. The ledge continues outward from the integral longitudinal edge 410 and up to the top edge 411. This creates a surface upon which lower conical wheels may roll. In other words, the top edge 411 is closer to the inner visor arm edge 442 than the bottom edge 410. The angle created by the transverse ledge is dependent upon the angle of conical wheels. The top longitudinal edge 411 in the assembled position is now just below the support rod 402. The upper outer support 453 forms a flat ledge 483 which runs perpendicular to the forward leading edge 440 of the visor shell. The ledge 483 begins at the forward leading edge and continues toward the back trailing edge 441 of the visor shell. The ledge is adjacent to and generally parallel to the inner visor arm end 442. The ledge has an integral longitudinal edge 435 molded to the shells top side 471 which runs linearly and perpendicular to the forward leading edge of the visor shell. The bottom longitudinal edge 433 of the ledge 483 runs parallel the integral edge and has been molded lowered down off the inside of the top side 471 of the shell. The ledge 483 is angled transverse from the top side 471 of the shell. The ledge continues outward from the integral edge 435 and down to the bottom edge 433. This creates a surface upon which upper conical wheels may roll. In other words, the bottom edge 433 is closer to the inner visor arm end 442 than the integral edge 435. The angle created by the transverse ledge is dependent upon the angle of conical wheels used. The bottom longitudinal edge 433 in the assembled position is now just above the support rod 402. Once the shell has been snapped together, a convex shape is formed by the outer upper support and the outer lower support. A slot 484 is formed through which the support rod can slide and travel.

FIG. 20 illustrates an exploded and enlarged view of several elements. Interior to the outer supports is a clamp 406. The clamp is formed of a pretreated metal and exerts a spring force against the support rod surface. The clamp is molded as one piece. The clamp has a top side 498 which has an inner surface and an outer surface 407. The clamp has a back longitudinal edge which is molded as an arc that curves from the top side and continues around generally perpendicular to the top surface 498 and continues until it is again parallel to top surface 498; this creates a bottom side which is now parallel and below the top surface. The bottom side has an inner surface and an outer surface. The front side of the clamp is open. A hole 489 is formed through each end of the clamp, creating an opening through which the support rod 402 can be slid. The clamps outer end 449 and inner end 472 have four slots 413 in each end. The slots are placed at each outer corner of the clamp. The slots hold the wheel assemblies 446. Conical wheels 447 are at each end of the integral axle. The wheel assembly is placed within the slots 413 and the longitudinal axis of the axles lie parallel the longitudinal sides of the clamp. The conical wheels extend outward from the outside ends of the clamps' ends and have a slightly higher profile than either the top or bottom side of the clamp. A small one piece, curved spring clip 448 shaped like a "U" is placed on the outside of each end of the clamp and under all four axles; just inside the conical wheels inner side. This causes a small amount of vertical outward force on each axle, toward the elongated clamp support 408. Between the outer support rails and inner support rails is the interior structure of the elongated clamp support. The interior top side and interior lower side of the shell creates the interior elongated clamp support structure. Each end of the elongated clamp support 408 is identical. As can be seen in FIG. 20, the lower inner support 488 and the upper inner support 487 are identical to the outer supports and also create a slot 485 (when the shell is snapped shut) through which the support rod can slide. The support rod is slid through one of the clamps end holes 489 and is forced between the clamps top side 498 inner surface and the clamps bottom surfaces inner surface. The clamps top side and bottom side are creating force against the rod. The force is sufficient to hold the visor shell from rotation and in place parallel a headliner but can be overcome by the user when the visor is rotated upon the rod into an in-use position.

The support rod 402 as shown is a lengthened piece of metal that has a round exterior. Upon the longitudinal surface area of the support rod is a cut section that creates a flat surface 481. The flat surface created runs longitudinally along the rod and causes the clamp 406 to snap into place around the cut section when the visor shell 401 is rotated toward the rested position. The flat surfaces' 281 formed position is dependent upon the vehicles roofline rake. The flat surface created is generally parallel the headliners surface.

Referring back to FIG. 19, the visor will slide forward and rearward over the support rod and clamp, and will also rotate down into use. With the visor shell 401 closed, the clamps conical wheel 447 will press against the elongated clamp supports lower and upper outer rails 495 and 453, respectively, and the elongated clamp supports lower and upper inner rails 488 and 487, respectively. The spring clip will maintain enough tension to keep the visor shell from sliding forward and rearward over the clamp assembly but can be overcome by user force. The user simply reaches up and pushes the trailing edge 441 of the visor forward and the visor shell will slide forward over the clamp assembly toward the windshield. When all the way forward, the user rotates the visor radially about the rod down into use and the clamp 406 will rotate about the rod. The clamp's force is sufficient to hold the visor shell from rotation when not in use, but user force can overcome the force of the clamp upon the support rod thereby allowing the shell and clamp to radially turn about the support rod.

FIG. 24 shows a cross-sectional view of the visor shell 401 with the clamp 406 being in place within the shell. The clamps bottom sides 450 and outer side 451 can be seen as the open end of the clamp is viewed. The clamp 406 is upon the support rod 402 and the conical wheels 447 can be seen resting against the ledges formed by the shell.

FIG. 21 illustrates an even further alternate embodiment of a sunvisor 500 that may be moved manually. A sunvisor shell 501 slides forward and rearward upon a support rod 502 which is curved at one end and terminates in a bracket which travels in a track (not visible in FIG. 21). The sunvisor shell 501 has a forward leading edge 540 which lies parallel and adjacent the windshield (not shown) in the rested position. The shell has a top side 571 which is generally rectangular in shape and is formed by the forward leading edge being one of the longitudinal sides; and a trailing edge 541 parallel to the forward leading edge and being the other longitudinal side of the visor shell. The ends of the visor shell are formed by an outer flexible end 599 and an inner visor arm end 542. The shell's bottom side 569 which is seen through the mirror cutout has the same shape as the top side of the shell and is below and lies on a plane which is parallel the top side of the shell. This creates a cavity within the shell. The shell is molded with a living hinge which is the forward leading edge 540. This allows the shell to be folded together over the support rod 502. The shell is snapped together along the trailing edge snap points 565 using common methods of closure.

The ends of the shell are generally perpendicular to the forward leading edge 540. The outer flexible end 599 is formed with a curvature to create a shape that keeps the sun from shining in at the upper corner of the windshield. The shape would vary based upon the vehicle. The inner visor arm end 542 is formed when the top and bottom sides of the shell are folded together, creating an elongated opening in the inner visor arm end 542. The inner visor arm end 542 has an elongated opening that is perpendicular to the forward leading edge 540 of the shell. The support rod 502 passes through the elongated opening in the end of the shell. The support rod is between the top side 571 and the bottom side 569 of the visor shell and is parallel to the forward leading edge of the shell but perpendicular to the inner visor arm end 542.

Within the interior of the shell 501 is a molded elongated clamp support 508. The elongated clamp support is a molded part of the interior of the top and bottom sides of the shell. The elongated clamp support has a lower outer support rail 595 and an upper outer support rail 553. The support rails are molded as a part of the inside of the bottom side 569 of the visor shell and molded as a part of the inside of the top side 571 of the visor shell. The lower outer support rail 595 is molded rising up off the bottom side of the shell interior, and stops at a longitudinal edge 511. The longitudinal edge lies just below the support rod in the assembled position and is parallel the top and bottom sides of the shell. The upper outer support rail is molded down off the interior of the shells top side interior; and stops at a longitudinal edge 533. The longitudinal edge lies just above the support rod in the assembled position. When the shell is snapped shut an elongated slot is formed by the upper inner edge 455 and the lower inner edge 494 through with the rod can slide.

FIG. 22 is an enlarged view of several components. Interior to the outer supports is a clamp 506. The clamp is formed of a pretreated metal and compresses against the support rods surface. The clamp has a top side 598 which has an inner surface and an outer surface 507. The clamp has a back longitudinal edge which is molded as an arc that curves from the top side and continues around generally perpendicular to the top surface 598 and continues until it is again parallel to top surface 598. This creates a bottom side which is now parallel and below the top surface. The bottom side is identical to the top side and has an inner surface and an outer surface. The front side of the clamp is open. A hole 589 is formed through each end of the clamp creating an opening through which the support rod 502 can pass.

The clamp's outer end 549 and inner end 572 each have four slots 513. The slots are placed at each outer corner of the clamps ends. The slots hold roller assemblies 546. The roller assembles 546 can be molded of plastic and are shown as one piece. The rollers rise slightly above the height of the clamp and have end axles of a smaller diameter than the rollers. The ends are placed in the slots. The roller assembly is placed within the slots 513 and the longitudinal axis of the axles lie parallel the longitudinal sides of the clamp. A small spring clip 548 is placed on the outside of each end of the clamp and under all four axles; just inside a small groove on the axles outer side. This causes a small amount of vertical outward force on each axle toward the shells top and bottom sides.

Referring back to FIG. 21, between the outer support rails and inner support rails is the interior structure of the elongated clamp support. The interior top side and interior lower side of the shell creates an interior elongated clamp support structure. A rack 590 which in this embodiment is molded upon the interior of the top side of the shell is molded just interior and adjacent to the interior elongated clamp support structure. The rack teeth lie parallel the support rod and clamp assembly. A gear 547 slides upon the end of the support rod. When the shell is closed, the gear teeth are in contact with the gear rack teeth and this keeps the visor shell from wracking when it is slid forward and rearward over the rod and clamp assembly. In other words, it keeps the shell ends perpendicular to the rod and clamp. The support rod passes through one of the clamps end holes 589 and is forced between the clamps top side 598 inner surface and the clamps bottom surfaces inner surface. The clamp's top side and bottom side are creating compressive spring force against the rod. The force is sufficient to hold the visor shell from rotation and in place parallel a headliner but can be overcome by the user when the visor is rotated upon the rod into an in-use position. The support rod 502 as shown is a lengthened piece of metal that has a round exterior. Upon the longitudinal surface area of the support rod is a chamfered, flattened section that creates a flat surface 581. The flat surface created, runs longitudinally along the rod and causes the clamp 506 to snap into place around the cut section when the visor shell 501 is rotated toward the rested position. The flat surfaces' 581 formed position is dependent upon the vehicles roofline rake etc. The flat surface created is generally parallel the headliner surface.

The visor will slide forward and rearward over the support rod and clamp, and will also rotate down into use. With the visor shell 501 closed, the clamps rollers 546 will press against the elongated clamp supports lower and upper interior surfaces respectively and the elongated clamp. The spring clip 548 will maintain enough tension to keep the visor shell from sliding forward and rearward over the clamp assembly but can be overcome by user force. The user simply reaches up and pushes the trailing edge 541 of the visor forward and the visor shell will slide forward over the clamp and gear assembly toward the windshield. When all the way forward, the user rotates the visor down into use and the clamp 506 and visor shell will rotate about the rod. The clamps force is sufficient to hold the visor shell from rotation when not in use, but user force can overcome the force of the clamp upon the rod thereby allowing the shell and clamp to radially turn about the support rod.

FIG. 25 shows a cross-sectional view of the visor shell 501 with the clamp 506 being in place within the shell. The clamp 506 is upon the support rod 502 and the gear 547 can be seen mounted upon the support rod and resting against the gear rack formed by the shell.

Figure 26:
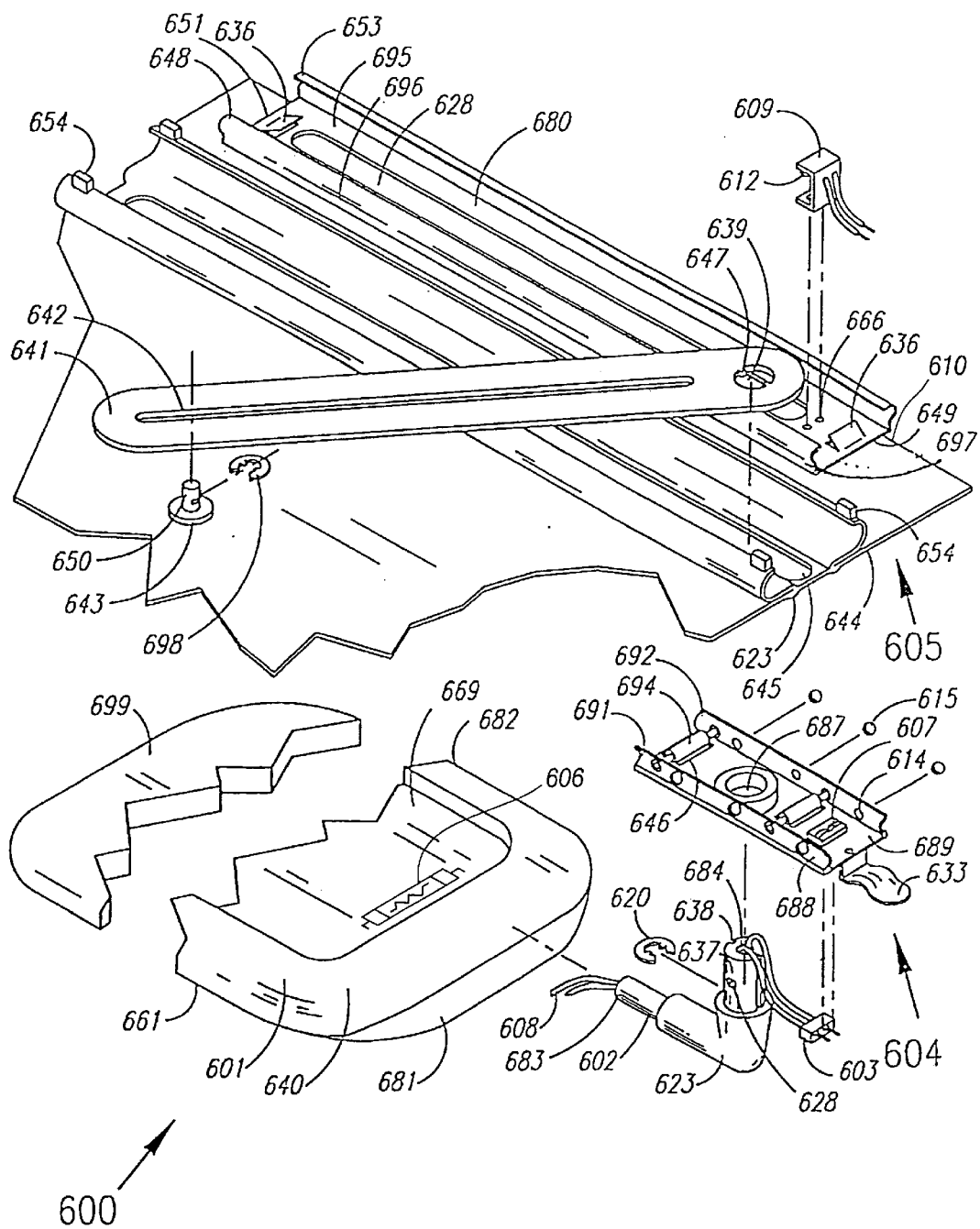
FIG. 26 is an isometric assembly view of the preferred embodiment showing the visor, track, bracket and control turn arm.

FIG. 26 illustrates an isometric assembly view of a preferred embodiment of a sunvisor 600. The sunvisor shown is a driver's side visor. The sunvisor has a shell 601 that is generally rectangular in shape with two longitudinal edges parallel each other and two end edges perpendicular to the longitudinal edges. The sunvisor shell has a top side 640 and a bottom side 669 which can be seen through a cut-out for the vanity mirror assembly. The vanity mirror assembly is not shown. The sunvisor in this assembly view is in the rested position with the elements exploded.

The sunvisor top side is parallel the headliner 644. The sunvisor has an outer end 699 which would be near an outside front window 3 as seen in FIG. 7. The outer end is flexible so as to bend with the side roofline of the headliner. The outer end can be seen to be curved with the forward end longer than the trailing end. This allows the sunvisor to block the sun near the cars sloping and angled forward post as the sunvisor is slid into use to the windshield area. The sunvisor has an inner end 681 which has an edge that lies generally perpendicular to the visor's longitudinal trailing edge 661. The leading edge of the visor 682 lies adjacent to and generally parallel the front edge of the headliner 644 when the sunvisor is in the rested position. The sunvisor inner end 681 has an elongated opening upon its edge through which a support rod 602 can be inserted. The support rod holds the sunvisor in place behind the windshield and allows the sunvisor to be moved to a multitude of positions for use.

The support rod 602 is round in shape and has a lower end 683 and an upper end 637. The ends are formed by bending the rod leaving approximately a 90° angle. The rod has a hollow interior along its longitudinal length and has an opening 684 through which bracket electrical wires 608 can be placed. The support rod upper end 637 travels up through a round bracket collar opening 687 in a bracket 688. The support rod has a plastic cover 623, covering the outer surface of the support rod near the angled portion. The cover stops just below the round bracket collar opening 687 in the bracket. The support rod which has a circumference just smaller than the diameter of the bracket collar opening 687; continues up though the opening. The upper end of the support rod is held perpendicular to the bracket, in the bracket collar opening. The bracket collar opening rises up from the bottom of the bracket and creates enough of a hollow shaft for the upper end of the support rod to be held vertically in the opening. The bracket assembly 604 is comprised of the bracket 688 that has a rectangular bottom side 689, two side walls 691 and 692 respectively which are formed off of the longitudinal edges of the bottom side. The side walls are formed and are generally perpendicular to the bottom sides surface and have surfaces that are parallel each other. The side walls are contoured longitudinally inward toward the center of the bracket and therefore have outside walls that allow for bearings 615 to be placed. Bearing holes 614 are placed along the contour of the brackets side walls, and the bearings when assembled are placed and rotate within these bearing holes. This allows the bracket to slide easily within a track assembly 605. The bracket has two small rollers 694 which have small axles molded integral to them. Each of the axles ride and rotate in two small axle holes that are opposed to each other and are in the side walls of the bracket. Once in place, the rollers longitudinal axis is now parallel the bottom of the bracket and also perpendicular to the brackets longitudinal sides. The rollers are placed through a small rectangular opening 646 in the brackets bottom side and depend just a little lower then the bottom side of the bottom of the bracket and roll along the top of the bottom side of the track. A lever 633 can be attached to the bottom side of the bracket. The lever is riveted to the inner end of the bracket nearest the center of the vehicle. The lever is narrower than the slot in the track and narrower than the opening in the track trim and extends down into the passenger compartment. Once the lever is just below the track trim 623, the levers surface curves and is parallel and below the track trim. The levers longitudinal surface is parallel the track trim opening. A small indentation or indentations can be made on the bottom side of the levers surface. The indentations allow the users thumb or finger to easily grasp and slide the visor without slipping from the lever. Electric is supplied to the mirror lighting 606 with a bracket wiring harness 608 and a track tower wiring harness 609 . The bracket wiring harness has a top connector 603 which has two wires that are place down through the top of the support rod once the support rod assembly is in place. The wires run down the hollow shaft of the support rod and exit near the vanity mirror assembly and are connected by any common known means to the wires from the mirror lighting. The top connector 603 is then riveted into place on the bracket contact strips 607. Electrical contact strips 612 riveted to the tower are on the bottom side and facing down. When the bracket assembly is slid to the rested position with the longitudinal sides of the visor parallel the track; the bracket contact strips 607 will now be making contact with the track tower contact strips 612 to complete a circuit. The track tower contact strips 612 are on the bottom side of the top horizontal overhanging surface. The track tower wiring harness is connected to the vehicles power supply and now, power is supplied to the mirror lighting. When the visor assembly is slid toward a side window in the track, there is no power. The length the visor could be slid with power is dependent upon how long the contact strips are on the tower. And they could be placed anywhere on the track but the logical place is in the rested position.

The bracket assembly 604 is placed within the track 605. The track 695 has a top side 680 which has a front longitudinal ledge 653. The top side has a trailing longitudinal ledge 648. The top sides ledges are parallel the bottom side of the track. The track has an elongated and centered opening along its entire top side. From an end view, the track would resemble a semi-closed flat sided C with an opening along the entire top side.

The front longitudinal ledge 653 of the track is adjacent and generally parallel the headliners 644 front edge 610 and also the front windshield of the vehicle (not seen). The tracks back longitudinal edge 696 is parallel the front track edge. The track has two ends; an outer end 651 and an inner end 649. The inner end would be mounted near the center of a vehicle while the outer end is near a front side window. This version is a drivers side window. The track has two side walls, side wall 697 and an opposing side wall. The side walls are formed from the longitudinal edges of the top side. The side walls are generally perpendicular to the top side. The width of the side walls is narrow and is defined by the perpendicular distance to the longitudinal edges of the top of the track and the bottom longitudinal edge of the side wall. The side walls surface is contoured outward from the tracks interior so as to allow bearings to be placed upon their interior wall. This allows the bracket to roll easily within the track. The side walls lower longitudinal edges now curve around to form the bottom side of the track. The bottom side of the track is now parallel the top side of the track. A slot 628 is cut or formed in the bottom side of the track. The slot begins adjacent to the tracks outer end 651 and continues the length of the track and stops adjacent the electrical tower mount 666. The slot is centered down the length of the track. The slot creates an elongated opening through which the support rods upper end 637 can be placed.

The bracket is slid into one of the ends of the track; preferably the end that would be near the center of the vehicle. The bracket assembly 604 is slid in with the attached rollers in place. The bearings 615 are placed as the bracket is slid into the open end of the track. Once the bracket is in place, the stop tabs 636 placed at each end of the track can be bent up into place preventing the bracket from sliding back out of the tracks ends. The bracket assembly is slid into the track until the bracket collar hole 687 is centered over the slot 628 in the track. Now the support rod can be slid into place; up through the headliners track trim slot 645. The track trim slot is created in the track trim 623 which can be glued or secured to the headliner. The track trim 623, trims out the opening in the headliner where the support rod extends into the interior of a vehicle. It also securely holds the track in place. The track trims upper portion above the headliner, has the same shape as the track and the track is snapped into place in the track trim. Four small track spacers 654 are placed on the top side of the track near the corners. The spacers would be molded to or attached to the track to allow room for the control turn arm to slide above the track and below a vehicles sheetmetal roof. The support rod continues up through the slot 628 in the track and up through the bracket collar hole 687. The upper end 637 of the support rods longitudinal axis is now perpendicular to the bracket bottom. The support rod is held in place in the bracket by spring collar clip 620 Which is slid around the upper support rods surface. The spring collar clip is slid into place into a groove 628 which is placed around the circumference of the support rod. The spring clips bottom surface now rests on the top of the bracket collar hole and the support rods upper end now is held in place and rides in the bracket.

The support rod upper end 637 rises vertically just above the tracks ledges 653 and 648 respectively. A control turn arm 641 can now be slid down onto the shaft of the upper end of the support rod. The control turn arm 641 has a mounting hole 639 which is generally circular in shape and has two semi-rectangular protrusions 647 extending outward from the inner edge of the opening. The protrusions are generally placed opposing each other at 180° in the openings inner edge. The control turn arms opening can now be slid down onto the support rods upper end 637. The support rod has two opposing channels 638 formed along its outer surface. The channels are semi-rectangular in shape and begin at the top of the support rods upper end 637 and extend down vertically along the longitudinal axis of the support rods upper end. The channels stop just above the tracks upper side ledges 653 and 648 respectively (when the upper end of the support rod is in place). The channels are indented grooves upon the upper end of the support rods outer surface. The control turn arm now is in place above the top side of the track ledges. It is held off of the top side of the track, as the support rods channels 638 stop just above the ledges 653 and 648 and the protrusions stop the control turn arm from sliding further down the shaft of the support rods upper end or from rubbing on the top side of the track; therefore holding it just above the top side of the track. The protrusions 647 extending outward from the mounting hole 639 are now in the support rods channels 638 and prevent the control turn arm from rotating about the radial axis of the support rods upper end. The support rods upper end 637 can rotate in the bracket collar hole when assembled and when the control turn arm 641 is forced to turn. The support rods upper end will then rotate in the bracket collar hole.

Adjacent to and behind the track assembly 605 is a channel guide 643 that mounts to the headliner. It can be glued or secured by other known means to the headliner or could be molded or mounted to an extension panel.

In the embodiment shown, the channel guide 643 is mounted to the top surface of the headliner 644. The channel guide is round in shape and has a base wider in circumference then a guide tower 650 which rises vertically off the base. The tower is round and has a diameter just smaller than the width of a channel guide slot 642 in the control turn arm. The control turn arm has a top and bottom side which create two longitudinal edges and two ends generally perpendicular to the longitudinal edges. Near the leading end of the control turn arm is a mounting hole 639. The channel guide slot 642 begins adjacent and behind the control turn arm mounting hole and continues to the trailing end of the control turn arm, and ends just before the trailing end. The channel guide slots width is just wider than the channel guide tower and can be slid over the top of the channel guide tower. The channel guide slots width being defined as the perpendicular distance between the two longitudinal edges of the channel guide slot. A lock washer 698 is clipped into place on the tower; it is clipped above the control turn arm and keeps it in place.

In the assembly view shown, the channel guide 643 is generally centered behind the tracks longitudinal back edges and the tracks ends. The channel guide is also centered in relation to the leading end and trailing end of the control turn arm. When the sunvisor assembly is completed, the visor shell is in a rested position beneath the track and headliner. The sunvisors longitudinal sides are parallel the tracks longitudinal sides. The outer end of the visor 699 is generally perpendicular to the longitudinal sides of the track and below the outer end 651 of the track.

When the sunvisor is in the rested state, the control turn arm 642 has its leading end with the mounting hole 639 generally above and adjacent the inner end 649 of the track. The control turn arms bottom side is above, adjacent and parallel the tracks top ledges 653, 648. The control turn arm transverses the tracks longitudinal sides. The control turn arms longitudinal sides continue back toward and behind the channel guide 643 which is now securely mounted to the top of the headliner 644. The control turn arms slot 642 is resting around the channel guide tower 650. Once in the rest position, the control turn arms leading end is closer to the inner end of the track and the control turn arms trailing end is nearer the outer end of the track.

As the bracket assembly 604 is slid laterally in the track from the rested position near the inner end of the track to an in-use side window position near the outer end of the track; the control turn arm will first be pushed by the support rod and bracket, and will slide backward over the guide tower.

When the bracket and support rod reach a position in the track that makes the control turn arms longitudinal sides perpendicular to the tracks longitudinal sides; the support rod and bracket if continued to be slid, will now be pulling the control turn arm. The whole time this is occurring, the control turn arm is sliding over the stationary tower guide and changing its angle relative to the longitudinal sides of the track. The control turn arm is rotating the support rod and sunvisor counterclockwise and toward the side window. The reverse occurs when the user slides the bracket back toward the rested position.

Figure 27:
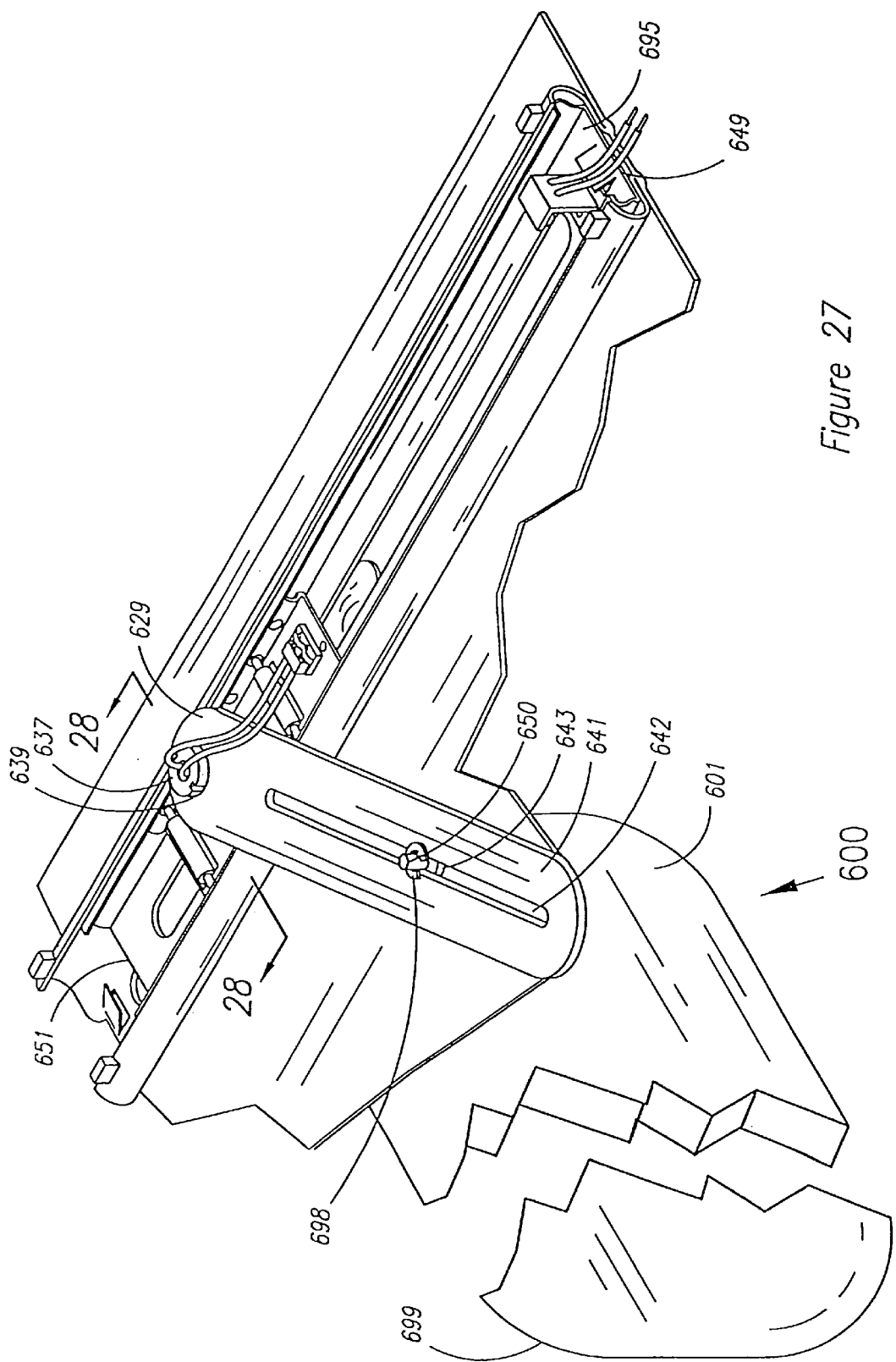
FIG. 27 is an assembled isometric view of the preferred embodiment shown in FIG. 26 in the in-use position perpendicular to the track, with the control turn arm attached above a headliner and showing movement of the visor assembly with the control turn arm.

Referring to FIG. 27 which shows an assembled view of the visor 600 in the in-use position perpendicular to the track, the sunvisor would be beside the driver's side window (not shown). The sunvisor shell 601 has its top and bottom sides hanging vertically in the in-use position. The control turn arm 641 is in a position with its leading edge 629 near the outer end 651 of the track and its mounting hole 639 above the track and near the outer end of the track. The control turn arm slot 642 is mounted over and around the tower 650 on the channel guide 643. The tower is near the trailing end of the control turn arm slot. In this position, the sunvisor is near the outer end of the track and the control turn arm and the control turn arms slot are near their furthest position forward.

To return the sunvisor to a rest position parallel the windshield, the following would occur. As the sunvisor is slid below the headliner from the side position which is with the longitudinal sides of the sunvisor shell perpendicular to the track; The bracket slides in the track 695 toward the inner end 649 of the track, the support rod upper end 637 rides in the brackets bracket collar hole and as the bracket slides, the support rod upper end 637 which is attached to the control turn arm 641 is forced to turn clockwise, the support rods upper end is now forcing the control turn arm to slide rearward. The control turn arm is sliding around the channel guides tower 650. When the bracket approaches the point in the track where the control turn arms longitudinal sides are perpendicular to the tracks longitudinal sides; the bracket and support arms upper end 637 will now be pulling the control turn arm 641. The control turn arm continues to force the upper end of the support rod to turn clockwise. This forces the sunvisor shells outer end 699 to be pulled and to turn back from a position along a side window and distant from the tracks outer end to a position below the tracks outer end 651. In other words the outer end of the sunvisor follows the side roofline and is turned by the attached horizontal lower end of the support rod which is being turned by the upper end of the support rod; which is being forced to turn by the control turn arm in the channel guide.

Figure 28:
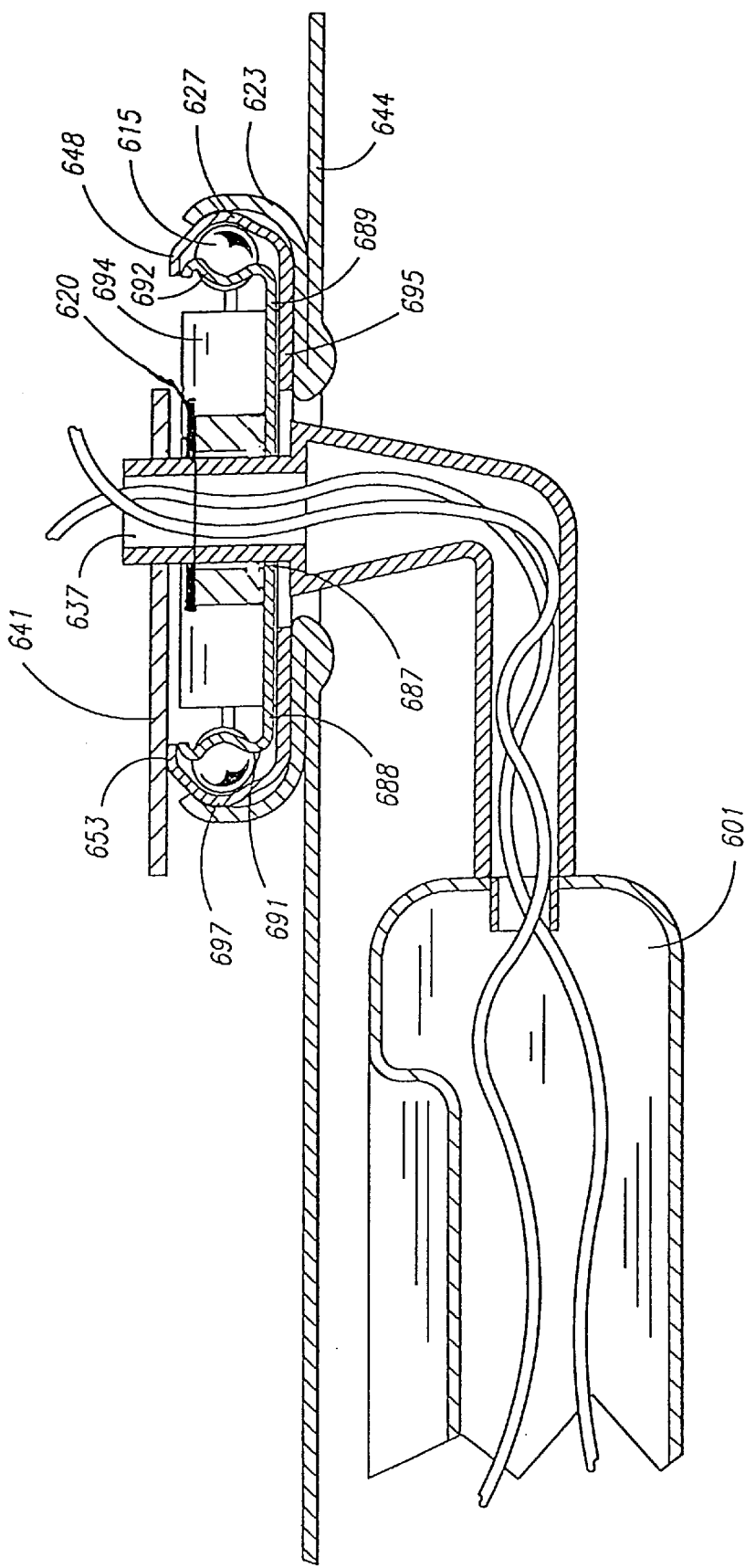
FIG. 28 is a cross section of Lines 28—28 of FIG. 27 of the preferred embodiment showing the track and visor and control turn arm of the sunvisor.

Referring to FIG. 28, a cross section of lines 28—28 of FIG. 27 shows a more detailed view of the track and bracket can be seen. The track 695 is secured above the headliner 644 of a vehicle. The track is snapped into place inside of track molding 623. The track molding is formed around the headliners cut out opening for the track assembly. The track molding is formed on the side above the headliner and is similar to the shape of the track; With a curved outward longitudinal front side and a curved outward longitudinal back side, therefore the track is snugly fit within the form of the track molding. The track molding continues onto the interior side of the headliner and trims out the opening through which the upper end of the support rod 637 extends. A visor shell 601 is attached to the lower end of the support rod and rests in the interior of the car. The support rod travels up through a track trim opening 648 and up into a bracket bottom 689. The support rod upper end continues vertically up through a bracket collar hole 687. With the support rods upper end in place, a spring ring clip 620 is secured around a circular groove indented in the support rods circumference. The spring clips bottom surface now rests on the top of the bracket collar 687 top surface. This keeps the support rod in place in the bracket. The support rod continues up passed the top of the tracks ledges 653 and 648 respectively. The control turn arm 641 is slid over the shaft of the top of the support rod and into place. The control turn arm extends horizontally back toward a channel guide, (not shown) which is secured to the top side of the headliner 644. The tracks side walls 697 and 627 are formed generally perpendicular to the top side and bottom side of the track. The side walls are contoured outward from the tracks center. This forms a contour on the inner walls of the tracks sides. Bearings 615 in the form of rolling elements roll against the tracks inner side walls when the bracket 688 is moved in the track. The bracket has two side walls 691 and 692 respectively that are formed from the longitudinal edges of the bottom side of the track. Tile two side walls are contoured inward toward the center of the bracket and have holes (which are smaller in diameter than the bearings) along their respective surfaces that allow for the placement and holding of the bearings 615. On the bottom side of the bracket 689 are two rollers 694 which have integral axles along their longitudinal axis that are mounted in the brackets side walls. The rollers longitudinal axis is mounted perpendicular the side walls and the rollers depend down lower then the bottom of the bottom side of the bracket and therefore roll on the top surface of the bottom of the track.

Figure 29:
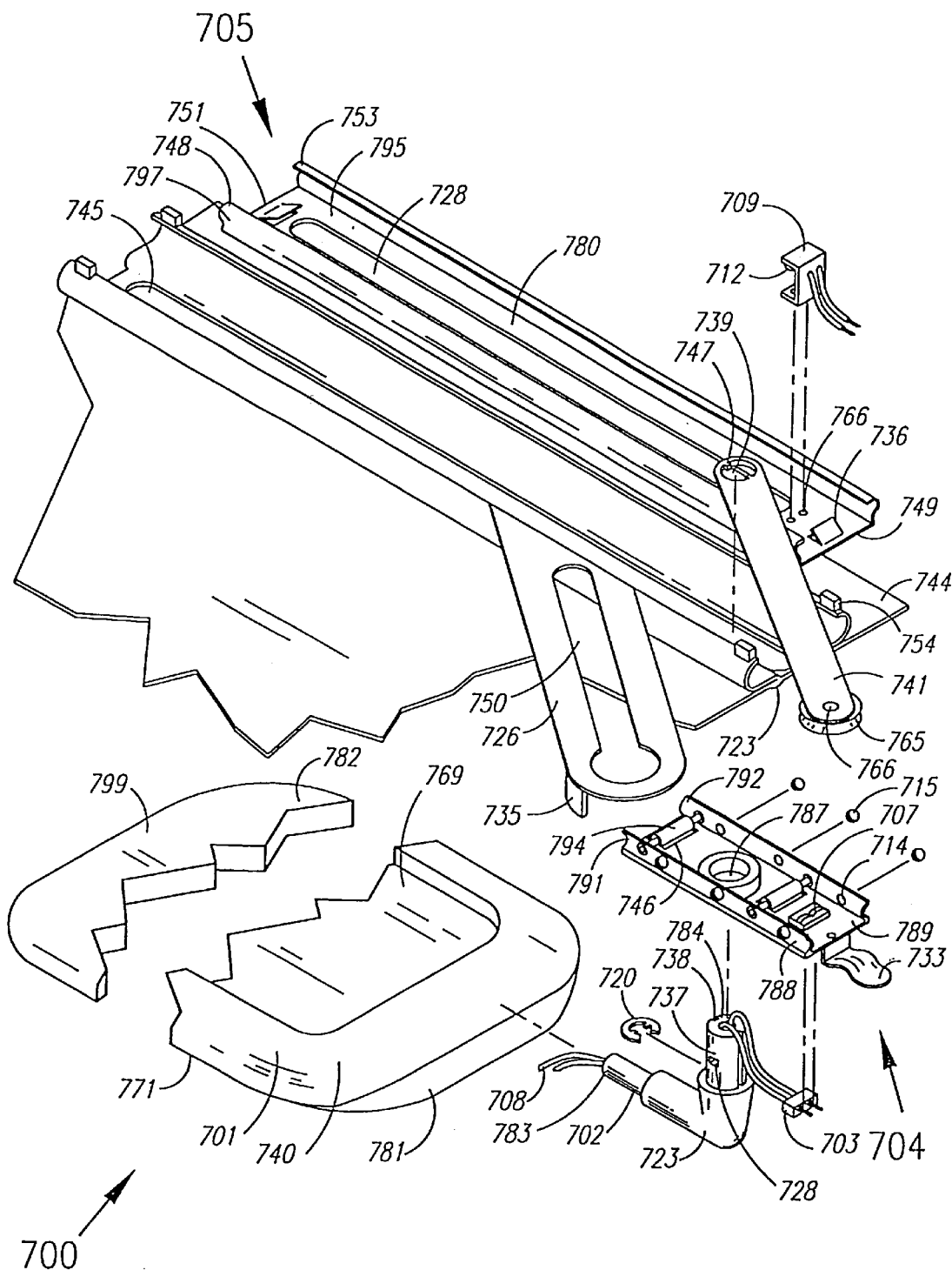
FIG. 29 is a further alternate embodiment showing an isometric assembly view of the sunvisor, track, bracket and control turn arm.

FIG. 29 is an alternate embodiment that illustrates an isometric assembly view of the another embodiment of a sunvisor 700. The sunvisor shown is a drivers side visor. The sunvisor has a shell 701 that is generally rectangular in shape with two longitudinal edges parallel each other and two end edges perpendicular the longitudinal edges. The sunvisor shell has a top side 740 and a bottom side 769 which can be seen through a cut out for the vanity mirror assembly. The vanity mirror assembly is not shown. The sunvisor in this assembly view is in the rested position with the pieces ready to be assembled; the sunvisors top side is parallel the headliner 744. The sunvisor has an outer end 799 which would be near an outside front window. The outer end is flexible so as to bend with the side roofline of the headliner. The outer end can be seen to be curved with the forward end longer than the trailing end. This allows the sunvisor to block the sun near the cars sloping and angled forward post as the sunvisor is slid into use in the windshield area. The sunvisor has an inner end 781 which has an edge that lies generally perpendicular to the visors longitudinal trailing edge 771. The leading edge of the visor 782 lies adjacent to and generally parallel the front edge of the headliner 744 when the sunvisor is in the rested position. The sunvisors inner end 781 has an opening upon its edge near a corner of the sunvisor through which a support rod 702 can be inserted. The support rod holds the sunvisor in place behind the windshield and allows the sunvisor to be moved to a multitude of positions for use.

The support rod 702 is round in shape and has a lower end 783 and an upper end 737. The ends are formed by bending the rod; leaving an approximately 90° angle. The rod has a hollow interior along its longitudinal length and has an opening 784 through which electrical wires 708 can be placed. The support rods upper end 737 travels up through a round bracket collar opening 787 in a bracket 788. The support rod has a plastic cover 723 for looks, covering the outer surface of the support rod near the angled portion. The cover stops just below the round bracket collar opening 787 in the bracket. The support rod which has a circumference just smaller than the diameter of the brackets collar opening 787; continues up though the opening. The upper end of the support rod is held perpendicular to the bracket, in the brackets collar opening; as the brackets collar opening rises up from the bottom of the bracket and creates enough of a hollow shaft for the upper end of the support rod to be held vertically in the opening. The bracket assembly 704 is comprised of a bracket 788 that has a rectangular bottom side 789, two side walls 791 and 792 respectively which are formed off of the longitudinal edges of the bottom side. The side walls are formed and are generally perpendicular to the bottom sides surface and have surfaces that are parallel each other. The side walls are contoured longitudinally inward toward the center of the bracket and therefore have outside walls that allow for bearings 715 to be placed. Bearing holes 714 are placed along the contour of the brackets side walls, and the bearings when assembled are placed and rotate within these bearing holes. The holes are smaller in diameter than the bearings. This allows the bracket to slide easily within a track assembly 705. The bracket has two small rollers 794 which have small axles molded integral to them. Each of the axles ride and rotate in two small holes that are opposed to each other in the side walls of the bracket. The rollers longitudinal axis is now parallel the bottom of the bracket and also perpendicular to the brackets longitudinal sides. The rollers are placed through a small rectangular opening 746 in the brackets bottom side and depend just a little lower then the bottom side of the bottom of the bracket and roll along the top of the bottom side of the track. A lever 733 can be attached to the bottom side of the bracket bottom 788. The lever is riveted to the inner end of the bracket; the end of the bracket nearest the center of the vehicle. The lever is narrower than the slot in the track and narrower than the opening in track trim 723 and extends down into the passenger compartment. Once the lever is just below the track trim 723, the levers surface curves and is parallel and below the track trim. The levers longitudinal surface is parallel the track trim opening. A small indentation or indentations can be made on the bottom side of the levers surface. The indentations allow the users thumb or finger to easily slide the visor without slipping from the lever. Electric is supplied to mirror lighting with a bracket wiring harness 708 and a track tower 709. The bracket wiring harness has a top connector 703 which is soldered to bracket strips 707. The wires are placed down through the top of the support rod once the support rod assembly is in place in the track. The wires run down the hollow shaft of the support rod and exit near the vanity mirror assembly and are connected to the mirror lighting by common known methods. The top connector is riveted into place in the rivet holes 766 in the track. When assembled, the track tower rises up from the surface of the track and just above the track ledges 753 and 748. When the bracket assembly is slid to the rested position with the longitudinal sides of the visor parallel the track; the contact strips 707 on the bracket will now be making contact with the track tower connectors strips 712 on the bottom side of the top horizontal overhanging surface. The track tower wiring harness is connected to the vehicles power supply and now power is supplied to the mirror lighting. When the visor assembly is slid toward a side window in the track, there is no power. The length the visor could be slid with power is dependent upon how long the contact strips are on the tower, And they could be placed anywhere on the track but the logical place is in the rested position.

The bracket assembly 704 is placed within the track assembly 705. The track 795 has a top side 780 which has a front longitudinal ledge 753. The top side has a trailing longitudinal ledge 748. The top sides ledges are parallel the bottom side of the track. The track has an elongated and centered opening along its entire top longitudinal side. From an end view, the track would resemble a semi-closed flat sided C with an opening along the entire top side.

The front longitudinal ledge 753 of the track is adjacent and generally parallel the headliners 744 front edge and also a front windshield of the vehicle (not seen). The tracks back longitudinal ledge 748 is parallel the front track ledge. The track has two ends; an outer end 751 and an inner end 749. The inner end would be mounted near the center of a vehicle while the outer end is near a front side window. In this version it would be the drivers side window. The track has two side walls, side wall 797 and an opposing side wall. The side walls are generally perpendicular to the top side. The width of the side walls is narrow and is defined by the perpendicular distance to the longitudinal edges of the top of the track and the bottom longitudinal edge of the side wall. The side walls surface is contoured outward from the tracks interior so as to allow bearings to be placed upon their interior wall. This allows the bracket to roll easily within the track. The side walls lower longitudinal edges now curve around to form the bottom side of the track. The bottom side of the track is now parallel the top side of the track. A slot 728 is cut or formed in the bottom side of the track. The slot begins adjacent to the tracks outer end 751 and continues the length of the track and stops adjacent the electrical mount 766. The slot is centered down the length of the track. The slot creates an elongated opening through which the support rods upper end 737 can be placed.

The bracket is slid into one of the ends of the track; preferably the end that would be near the center of the vehicle. The bracket assembly 704 is slid in with the attached rollers in place. The bearings 715 are placed as the bracket is slid into the open end of the track. Once the bracket is in place; the stop tabs 736 placed at each end of the track can be bent up into place, preventing the bracket from sliding back out of the tracks ends. The bracket assembly is slid into the track until the bracket collar hole 787 is centered over the slot 728 in the track. Now the support rod can be slid into place; up through the headliners track trim opening 745. The track trim opening is created in the track trim 723 which can be glued or secured to the headliner. The track trim 723, trims out the elongated opening in the headliner where the support arm extends into the interior of a vehicle. It also securely holds the track in place. The track trims upper portion above the headliner, has the same shape as the track and the track is snapped into place in the track trim. Four small track spacers 754 are placed on the top side of the track near the corners. The spacers would be molded to or attached to the track to allow room for the control turn arm to slide above the track and below a vehicles sheetmetal roof. The support rod continues up through the slot 728 in the track and up through the bracket collar hole 787. The upper end 737 of the support rods longitudinal axis is now perpendicular to the bracket bottom. The support rod is held in place in the bracket by spring collar clip 720 Which is slid around the 20 upper support rods surface. The spring collar clip is slid into place into a groove 728 which is placed around the circumference of the support rod. The support rods upper end now is held in place and rides in the bracket.

The support rod upper end 737 rises vertically just above the tracks ledges 753 and 748 respectively. A control turn arm 741 can now be slid down onto the upper end of the support rod. The control turn arm 741 has a mounting hole 739 which is generally circular in shape and has two semi-rectangular protrusions 747 extending from the inner edge of the opening. The protrusions are generally placed opposing each other at 180° in the openings inner edge. The control turn arm opening can now be slid down onto the shaft of the support rods upper end 737. The support rod has two channels 738 formed along its outer surface. The channels are semi-rectangular in shape and begin at the top of the support rods upper end 737 and extend down vertically along the longitudinal axis of the support rods upper end. The channels stop just above the tracks upper side ledges 753 and 748 respectively (when the support rod is in the assembled position). The channels are indented grooves upon the upper end of the support rods outer surface. The control turn arm would be in place above the top side of the tracks ledges. It is held off of the top side of the track, as the support rods channels 738 stop just above the ledges 753 & 748 and the protrusions stop the control turn arm from sliding further down the shaft of the support rods upper end or from rubbing on the top side of the track; therefore holding it just above the top side of the track. The protrusions extending outward from the mounting hole 739 are now in the support rods channels and prevent the control turn arm from rotating about the radial axis of the support rods upper end. The support rods upper end 737 can rotate in the bracket collar hole when assembled and when the control turn arm 741 is forced to turn. The support rods upper end will then rotate in the bracket collar hole.

Attached to the back ledge 748 of the track is a channel guide panel 726 that extends rearward and parallel the tracks top side. The channel guide panel has two longitudinal side edges that transverse the tracks longitudinal sides. A small spacer 735 is placed on the bottom side of the panel adjacent the trailing edge; this keeps the panel raised off the headliners top side so that a wheel and shaft can slide. The panels forward edge which is attached or molded to the rear ledge of the track and is near the inner end 749 of the track. The longitudinal side edges of the channel guide panel continue away from the longitudinal back ledge 748 of the track and also inward or away from the outer edge of the track. The channel guide panel has an elongated slot 750 that begins adjacent and just behind the tracks rear ledge and continues until it is adjacent the rear trailing edge of the extension panel. The elongated slots longitudinal edges are parallel the channel guide panels longitudinal edges. At the end of the control turn arm, opposite the mounting hole is an attached wheel 765. The wheel is attached below the bottom side of the control turn arm and has its shaft riveted 766 to the control turn arms surface and can rotate freely about its shaft. The wheel has a top and a bottom side. The wheels outer surface circumference is contoured inward around its circumference and is placed within the channel guides slot 750. The wheel and shaft are then placed within the channel guide panels slot 750 near the trailing end of the slot. A circular opening bigger than the wheel and shaft allows placement. The control turn arm is then pulled forward and can now be slid down over the top of the support rod upper end.

Once the control turn arm has been attached to the support rod the following happens. The bracket assembly 704 slides with the support rods upper end toward the outer end 751 of the track; the attached control turn arm is trailing the bracket assembly 704 and is pulled forward in the extension slot 750. The control turn arms wheel 765 rolls along over the top and bottom edges of the slot and as the control turn arm slides forward; The angle of the control turn arm; which is mounted to the wheel and is above it and above the slot; changes angle relative to the longitudinal sides of the track. As the angle of the control turn arm changes, it forces the upper end of the support rod to rotate counterclockwise in the bracket collar hole 787. The support rod is turned and the visors outer end 799 turns and follows the roofline of the vehicle. When the bracket is all the way to the end of the tracks outer end the control turn arms wheel will be adjacent the tracks rear ledge. The visor will now be turned approximately 90°.

Figure 30:
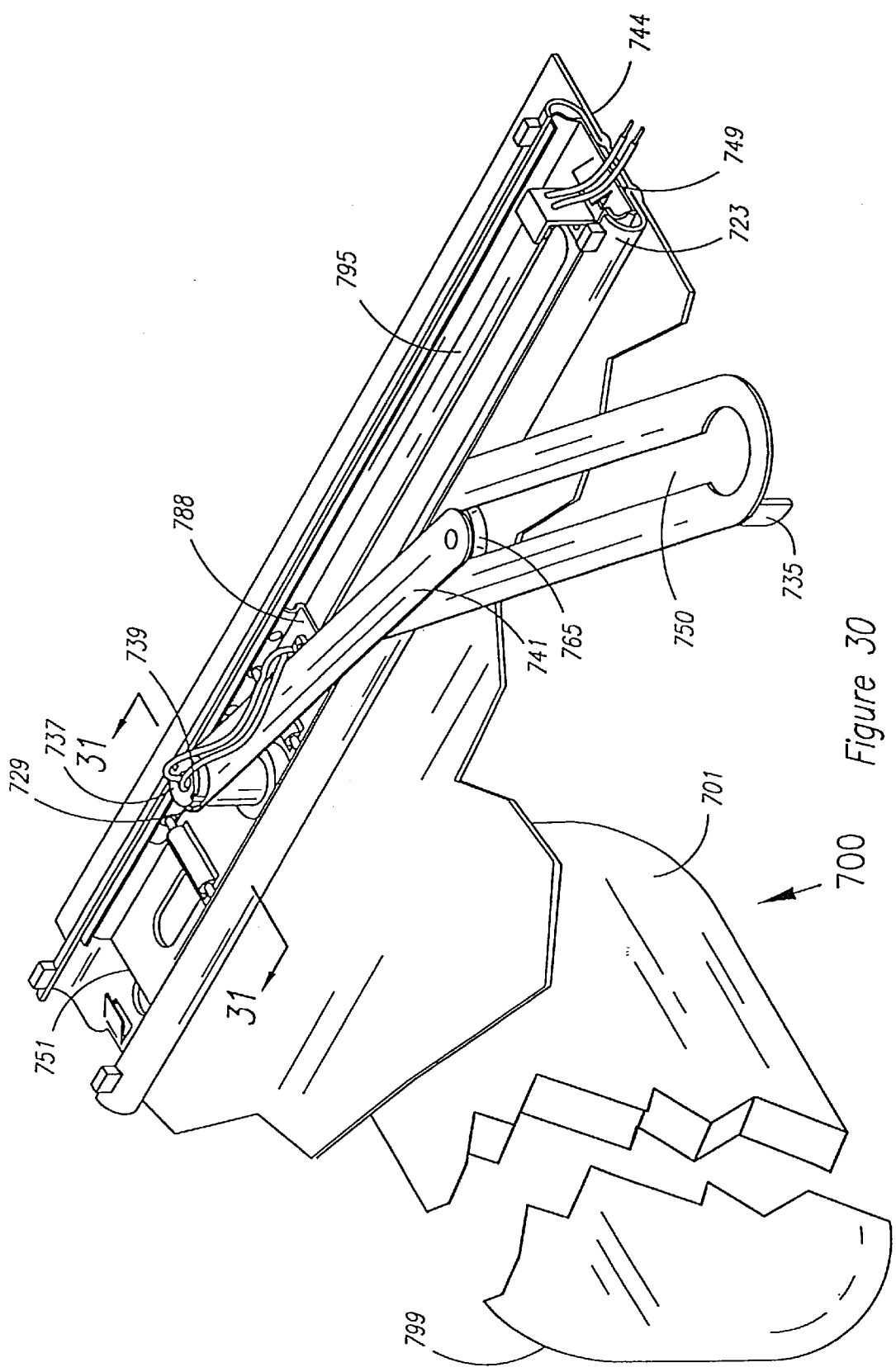
FIG. 30 is an alternate embodiment showing an assembled isometric view of the visor in the in-use position perpendicular the track, with the control turn arm attached above a headliner.

FIG. 30 shows the alternate embodiment as an assembled view of the visor 700 in the in-use position perpendicular the track. In this position the sunvisor would be beside the drivers side window (not shown). The sunvisor shell 701 has its top and bottom sides hanging vertically in the in-use position. The control turn arm 741 is in a position with its leading edge 729 near the outer end 751 of the track and its mounting hole 739 above the track and near the outer end of the track. The control turn arms wheel 765 has been pulled to adjacent the back edge of the track trim 723. The sunvisors support rod 737 is near the outer end of the track, the control turn arm and the control turn arms wheel are at their furthest position forward.

To return the sunvisor to a rested position parallel the windshield, the following would occur. As the sunvisor is slid below the headliner 744 from the side position; which is with the longitudinal sides of the sunvisor perpendicular to the track; The bracket 788 slides in the track 795 toward the inner end 749 of the track, the support rods upper end 737 rides in the brackets bracket collar hole and as the bracket slides, the support rods upper end which is attached to the control turn arm 741 is forced to turn clockwise, the support rods upper end is now forcing the control turn arm to slide rearward. The control turn arms wheel is sliding in the channel guide panels slot 750. The bracket assembly is pushing the control turn arm and wheel backward in the channel guide panels slot 750. The control turn arm continues to force the upper end of the support rod to turn clockwise. This forces the sunvisor shells outer end 799 to be pulled and to turn back from a position along a side window and distant from the tracks outer end to a position below the tracks outer end. In other words the outer end of the sunvisor follows a vehicles side roofline and is turned by the attached horizontal lower end of the support rod (not shown) which is being turned by the upper end of the support rod which in being forced to turn by the control turn arm in the channel guide panels slot.

Figure 31:
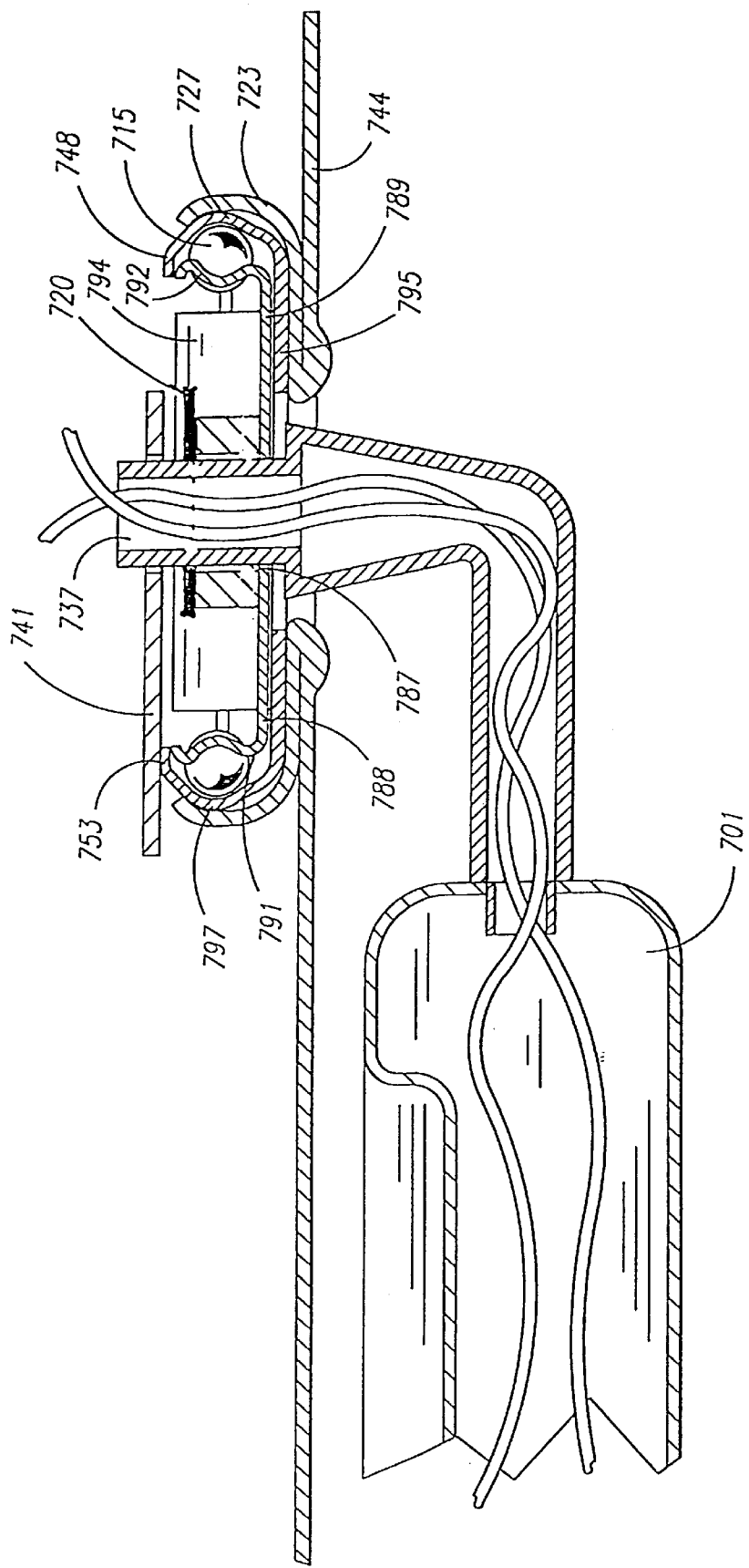
FIG. 31 is the alternate embodiment showing a cross sectional view of lines 31—31 of FIG. 30 of the track and visor and control turn arm.

FIG. 31 is a cross section of lines 31—31 of FIG. 30. The alternate embodiment shows a more detailed view of the track and can be seen looking at an end view. The track 795 is secured above the headliner 744 of a vehicle. The track is snapped into place inside of track molding 723. The track molding is formed around the headliners cut out opening for the track assembly. The track molding is formed on the side above the headliner identical to the shape of the track; With a curved outward front side and a curved outward back side, therefore the track is snugly fit within the form of the track molding. The track molding continues onto the lower side of the headliner and trims out the opening through which the upper end of the support rod 737 extends. The support rod travels up through the opening and up into a bracket 788. The support rods upper end continues vertically up through a bracket collar hole 787. With the support rods upper end in place, a spring ring clip 720 is secured around the circular groove 727 indented in the support rod. The spring clip now rests on the top of the brackets bracket collar holes 787 top surface. This keeps the support rod in place in the bracket. The support rod continues on up passed the top of the tracks ledges 753 and 748 respectively. The control turn arm 741 is mounted over the top of the support rod and into place. The control turn arm extends horizontally back toward a channel guide (not shown) which is secured to the top side of the headliner 744. The tracks side walls 797 and 727 are formed generally perpendicular to the top side and bottom side of the track. The side walls are contoured outward from the tracks center. This forms a contour on the inner walls of the tracks sides. Bearings 715 roll against the tracks inner side walls when a bracket 788 is moved in the track. The bracket has a rectangular bottom side which has the bracket collar hole 787 formed from its surface. The bracket collar hole rises up off the bottom of the bracket and has a round hole or shaft through which a support rods upper end 737 can be slid. The bracket has two side walls 791 and 792 respectively that are formed from the longitudinal edges of the bottom side of the track. The two side walls are contoured inward toward the center of the bracket and have holes along their respective surfaces that allow for the placement and holding of the bearings 715. On the bottom side of the bracket 789 are two rollers 794 which have integral axles along their longitudinal axis that are mounted in the brackets side walls. The rollers longitudinal axis is mounted perpendicular the side walls and the rollers depend down lower then the bottom of the bottom side of the bracket and therefore roll on the top surface of the bottom of the track.

Whereas, the present invention has been described in relation to the drawings attached hereto, it should be understood that other and further modifications, apart from those shown or suggested herein, may be made within the spirit and scope of this invention.

What is claimed is:

1. A sunvisor for a vehicle, which sunvisor comprises:
   (a) a sunvisor shell;
   (b) a support on a longitudinal track attached to a vehicle, said support moveable on said track with respect to said vehicle;
   (c) a rod extending from said support, said rod rotatable axially within said support;
   (d) an arm connected to said rod, said arm rotatable with said rod;
   (e) a slot in said arm to receive a channel guide, said arm is rotatable and slidable about said channel guide; and
   (f) a visor connected to said rod.
2. A sunvisor as set forth in claim 1 wherein said channel guide is mounted to a vehicle headliner.
3. A sunvisor as set forth in claim 1 wherein electric wires pass to said visor through said support rod.
4. A sunvisor as set forth in claim 1 wherein a vanity mirror is mounted on said visor shell.
5. A sunvisor as set forth in claim 1 wherein said track is connected to an electric system for said vehicle.
6. A sunvisor for a vehicle, which sunvisor comprises:
   (a) a sunvisor shell;
   (b) a support on a longitudinal track attached to a vehicle, said support moveable on said track with respect to said vehicle;
   (c) a rod extending from said support, said rod rotatable axially within said support;
   (d) an arm connected to said rod, said arm rotatable with said rod;
   (e) said arm having a wheel wherein said wheel engages said channel guide;
   (f) a visor connected to said rod.
7. A sunvisor assembly in a vehicle, comprising
   a sunvisor shell attached to a support, said support is rotatable in a bracket;
   a track having longitudinal sides substantially adjacent and parallel a window of said vehicle, said track having a slot for receiving said support;
   an arm attached to said support, said support is rotatable by said arm, said arm is rotatable and slidable about a channel guide, wherein said sunvisor shell and support are rotated by said arm as said bracket is slid along said track, thereby rotating said sunvisor shell between a position parallel to a windshield and parallel to said side window.
8. A sunvisor assembly as stated in claim 7 wherein said channel guide is adjacent said tack slot.
9. A sunvisor assembly as stated in claim 7 wherein said arm has a slot and said channel guide fits within said slot.
10. A sunvisor assembly as stated in claim 7 including a headliner having a slot adjacent and substantially parallel said window, wherein said shell is within said vehicle and said support travels up through said slot and is slidable with said bracket.
11. A sunvisor track assembly for a vehicle, which sunvisor track assembly comprises:
    (a) a headliner for a vehicle, said headliner including an elongated slot opening adjacent and substantially parallel an edge of said headliner;
    (b) a track having a slot and first and second side wall surfaces;
    (c) track trim secured to said headliner along said elongated slot openings, said track trim having a lower side contoured on the interior surface of said headliner;
    (d) wherein said track slot is aligned above headliner elongated slot opening, said track held to said headliner above said headline top surface by said track trim;
    (e) a rod rotatable in a bracket, said bracket slides in said track; and
    (f) a sunvisor shell attached to said rod.
12. A sunvisor track assembly as set forth in claim 11 wherein said track first and second side walls are secured between said track trims side walls.
13. A sunvisor track assembly as set forth in claim 11 including an arm attached to said rod, wherein said arm slides and rotates about a channel guide by rotating said rod and sunvisor shell as said bracket is slid along the track.
14. A sunvisor assembly attachable to a vehicle headliner, said sunvisor assembly comprising:
    a sunvisor shell attached to a support, said support is rotatable in a bracket;
    a track attached to said headliner, said track having longitudinal sides substantially parallel and adjacent a window of said vehicle, said bracket slidable in said track;
    an arm connected to said support, said support is rotated by said arm wherein said arm rotates about a channel guide slot; and
    a shaft secured to said arm, said shaft protruding off said arm and disposed within a channel guide slot and slidable therein, whereby said support and sunvisor shell are rotated by said arm as said bracket is slid in said track, wherein said sunvisor shell is rotated between a position parallel to a windshield and parallel said side window.
15. The sunvisor assembly as in claim 14 further comprises a trim track secured to said headliner, wherein said track is secured above said headliner and within said trim track's interior.

16. The sunvisor assembly as in claim 14 wherein said track has a slot.

17. The sunvisor assembly as in claim 14 wherein said trim track has a slot.

18. The sunvisor assembly as in claim 14 wherein a wheel is attached to said shaft.

19. A sunvisor for a vehicle which comprises:
   (a) a sunvisor shell attached to a rod, said rod is rotatable within a bracket;
   (b) a track's longitudinal sides positioned adjacent and substantially parallel a window of said vehicle, said bracket is slidable in said track;
   (c) a first stationary connector mounted in said vehicle, said first stationary connector supplied power by said vehicles power supply;
   (d) a second connector moveable with said sunvisor, said second connector supplies power to said sunvisor; and
   (e) wherein said first connector is stationary and said second connector moves as said bracket is slid in the track so that power is supplied to said sunvisor when said sunvisor is slid into a position where said first connector and said second connector are in contact with each other.

20. A sunvisor assembly as claimed in claim 19 includes power strips for said connectors.

21. A sunvisor assembly in a vehicle, comprising
   a sunvisor shell attached to a support, said support is rotatable in a bracket;
   a track having longitudinal sides substantially adjacent and parallel a window of said vehicle, said track having a slot for receiving said support;
   said bracket carrying said support including rolling elements coupled to said bracket and adapted to rollingly engage first and second surfaces of said track and position said shell at selected locations; and
   an arm attached to said support; said support is rotatable by said arm; said arm is rotatable and slidable about a channel guide, wherein said sunvisor shell and support are rotated by said arm as said bracket is slid along said track, thereby rotating said sunvisor shell to a position parallel a windshield or parallel a side window.

22. A sunvisor assembly attachable to a vehicle headliner, said sunvisor assembly comprising:
   a sunvisor shell attached to a support, said support is rotatable in a bracket;
   a track attached to said headliner, said track having longitudinal sides substantially parallel and adjacent a window of said vehicle, said bracket slidable in said track;
   said bracket carrying said support including rolling elements coupled to said brackets and adapted to rollingly engage first and second surfaces of said track and position said shell at selected locations;
   a slot in said headliner for receiving said support;
   an arm connected to said support, said support is rotated by said arm; said arm rotates about a channel guide slot, and;
   a shaft secured to said arm, said shaft protruding off said arm and disposed in said channel guide slot and slideable therein; whereby said support and sunvisor shell are rotated by said arm as said bracket is slid in said track, thereby rotating said sunvisor shell to a position substantially parallel a windshield or substantially parallel a side window.

23. A sunvisor assembly for a vehicle which comprises:
   a sunvisor shell attached to a support; said support is attached to a bracket;
   a track assembly positioned adjacent an edge of a headliner; said bracket is moveable in said track assembly;
   said bracket carrying said support including rolling elements coupled to said bracket and adapted to rollingly engage first and second surfaces of said track and position said shell at selected locations;
   a first stationary connector mounted in said vehicle, said first stationary connector is supplied power by said vehicles power supply;
   a second connector moveable with said sunvisor shell, said second connector supplies power to the sunvisor shell; and
   wherein said first connector is stationary and said second connector moves as said bracket is slid in said track assembly; power is supplied to the sunvisor shell when said sunvisor is slid into a position where said first connector and said second connector are in contact with each other.

24. A sunvisor assembly for a vehicle which comprises:
   a sunvisor shell attached to a support; said support is attached to a bracket;
   a track assembly positioned adjacent an edge of a headliner; said bracket is moveable in said track assembly;
   a first stationary connector mounted in said vehicle; said first stationary connector is supplied power by said vehicles power supply;
   a second connector moveable with said sunvisor; said second connector supplies power to a light;
   wherein said first connector is stationary and said second connector moves as said bracket is slid in said track assembly; power is supplied to said light when said sunvisor is slid into a position where said first connector and said second connector are in contact with each other.

* * * * *